US 6,598,056 B1

(12) United States Patent
Hull et al.

(10) Patent No.: US 6,598,056 B1
(45) Date of Patent: Jul. 22, 2003

(54) REMOTELY ACCESSIBLE BUILDING INFORMATION SYSTEM

(75) Inventors: Julie Jean Hull, Columbia Heights, MN (US); Patrick James O'Neill, Elk River, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/322,495

(22) Filed: May 28, 1999

Related U.S. Application Data
(60) Provisional application No. 60/119,928, filed on Feb. 12, 1999.

(51) Int. Cl.[7] .............................. G06F 7/00; G06F 17/00
(52) U.S. Cl. ........................ 707/104.1; 707/2; 707/10; 707/103
(58) Field of Search ................................. 705/7–10, 37, 705/29, 80, 1–5, 102, 104.1; 707/1–10, 100–104.1; 709/100–104, 200–203, 217–229; 345/965, 970, 764, 771; 700/182, 275

(56) References Cited

U.S. PATENT DOCUMENTS

| 4,918,615 A | * | 4/1990 | Suzuki et al. ............... 364/505 |
| 5,289,362 A | | 2/1994 | Liebl et al. .................. 364/140 |
| 5,499,371 A | | 3/1996 | Henninger et al. .......... 395/700 |
| 5,611,059 A | * | 3/1997 | Benton et al. ............... 395/326 |
| 5,671,361 A | * | 9/1997 | Brown et al. ................ 395/209 |
| 5,706,455 A | * | 1/1998 | Benton et al. ............... 395/348 |
| 5,761,674 A | * | 6/1998 | Ito .............................. 707/104 |
| 5,893,074 A | * | 4/1999 | Hughes et al. ................. 705/8 |
| 5,948,063 A | * | 9/1999 | Cooper et al. .............. 709/223 |
| 5,950,206 A | * | 9/1999 | Krause ....................... 707/104 |
| 5,960,196 A | * | 9/1999 | Carrier, III et al. ......... 717/122 |
| 5,991,769 A | * | 11/1999 | Fino et al. .................. 707/104 |
| 6,067,477 A | * | 5/2000 | Wewalaarachchi et al. ... 700/83 |
| 6,088,659 A | * | 7/2000 | Kelley et al. ................. 702/62 |
| 6,104,963 A | * | 8/2000 | Cebasek et al. ............. 700/86 |
| 6,141,595 A | * | 10/2000 | Gloudeman et al. .......... 700/83 |
| 6,157,943 A | * | 12/2000 | Meyer ........................ 709/203 |
| 6,178,362 B1 | * | 1/2001 | Woolard et al. ............ 700/295 |
| 6,240,326 B1 | * | 5/2001 | Gloudeman et al. .......... 700/83 |

* cited by examiner

Primary Examiner—Greta Robinson
Assistant Examiner—Linh Black

(57) ABSTRACT

A building information system and method processes building-related data associated with a building. The building-related data, including building management system data and configuration data associated with the building, is associatively stored in a database. A building management system service manages the building subsystem and provides the building management system data stored in the database. A data interface communicates the building-related data to the database. A client interface communicates the building-related data between a client application and the data interface. Other services includes a polling service for periodically detecting point data, a metering service for periodically detecting meter data, and a rates service providing real-time price control. A client/server architecture and consistent procedural interfaces facilitate integration of additional tools and devices.

9 Claims, 18 Drawing Sheets

REMOTELY ACCESSIBLE BUILDING INFORMATION SYSTEM

The present application claims the benefit of U.S. Provisional Application No. 60/119,928 entitled A REMOTELY ACCESSIBLE BUILDING INFORMATION SYSTEM, filed Feb. 12, 1999, specifically incorporated herein for all that it discloses and teaches.

BACKGROUND OF THE INVENTION

1. Field of the Invention

The present invention relates generally to electrical communications systems, and more particularly to systems and methods for monitoring and controlling building information systems.

2. Description of Related Art

In a large modern building, such as a manufacturing plant, a building operator can use a dedicated Building Management System (BMS) to manage different building subsystems coupled to the building, including boilers, thermostats, electrical subsystems, controllers, meters, and other equipment. The dedicated BMS typically monitors and controls the building subsystems using a communications network coupling each of the building subsystems. For example, the building operator can use a dedicated BMS to monitor the temperature in a specific zone of the building and to increase or decrease the heat provided to that zone. Typically, a dedicated BMS is executed in a personal computer or workstation located in the building, although such systems can also be operated remotely via a dial-up connection, a local-area network (LAN) or wide-area network (WAN). The data recorded by a dedicated BMS, however, is not readily available to other BMSs or to other applications that would benefit from such data. Furthermore, older dedicated BMSs have typically managed building components using a proprietary channel, which presents an obstacle to adding new service components, interfaces, or clients from different vendors.

Modern BMSs, however, have moved away from the proprietary systems of the late 1980s with the intent of improving a building operator's ability to integrate different vendors' subsystems. Such systems, facilitated by industry standard communication protocols such as "BACnet" and "Echelon", are typically characterized as "open-systems" and provide non-proprietary communication interfaces among building subsystems marketed by different vendors. Generally, BACnet and Echelon refer to different types of open-system building network protocols, which allow other BACnet-compliant or Echelon-compliant BMSs and building subsystems to communicate together. In contrast to dedicated BMSs that communicate over proprietary channels, open-system BMSs can provide ready, automatic access to disparate building subsystems without the need for specially developed, vendor-specific interfaces to each vendor's building subsystem. In other words, an open-system BMS can seamlessly communicate among the building subsystems of different vendors by providing an open-system interface supporting an open-system building network, like BACnet or Echelon.

While open-system BMSs address customer demands for choice and interoperability for managing building subsystems, modern BMSs do not fully address the complex requirements of modern building operators. The EXCEL BUILDING SUPERVISOR (XBS) v.1.4.2, marketed by Honeywell, Inc., is an example of a BMS, which is typically used to locally manage and control a building, including accessing dynamic data detected from points and meters within the building, viewing historical dynamic data, setting schedules for turning specific points on or off, viewing alarms when the dynamic data fails to satisfy an acceptable condition, and issuing control commands to points in the building. The term "points" refers to sensors and actuators on various building subsystems.

The BMS data provided by a typical BMS is severely limited in quantity and scope, consisting essentially of dynamic data and attributes. The dynamic (or time-varying) data is detected from or provided to points and meters within one or more buildings and stored within the BMS controller itself. The attributes typically include an 8-character identifier of the point or meter, a type characteristic (e.g., digital input, digital output, analog input, analog output), alarm conditions, priority characteristics, and status flags. The data provided by a BMS is not stored in a relational database and is not readily available for use by other non-BMS applications. Furthermore, the BMS does not provide or store configuration data (e.g., describing a particular site, a building, a piece of equipment, and/or a point (or meter) on that equipment) that is also of interest to a building operator. As such, a BMS does not facilitate integration of other needed data and services, such as remotely sending alarms to an email address of a building operator or owner to warn of detected problems with a particular piece of equipment in a particular building. This exemplary functionality is generally outside the scope of a BMS.

Because it is desirable to integrate the data and functionality from a BMS with data and functionality available from other systems, additional data, tools and services are needed to more fully meet these requirements. Furthermore, in some circumstances, a building operator may manage a building remotely or contract with a third party building management company to manage multiple buildings at different geographical locations. A need exists for a remotely accessible building information system that supports the integration of new data, tools and services with a BMS.

SUMMARY OF THE INVENTION

In accordance with a preferred embodiment, a method for processing building-related data associated with a building on a building management system network is provided. A request is received by a server process from a client application through a client interface. A database storing the building-related data including building management system data and configuration data associated with the building is accessed in accordance with the request. An acknowledgment of the accessing operation is issued to the client application, the acknowledgment including at least one element of the building-related data.

In accordance with another preferred embodiment, a building information system for processing building-related data associated with a building is also provided, including a database storing the building-related data including building management system data and configuration data associated with the building. A building management system service manages the building subsystem and provides the building management system data stored in the database. A data interface communicates the building-related data to the database. A client interface communicates the building-related data between a client application and the data interface.

DETAILED DESCRIPTION OF THE PREFERRED EMBODIMENT

Figure 1:
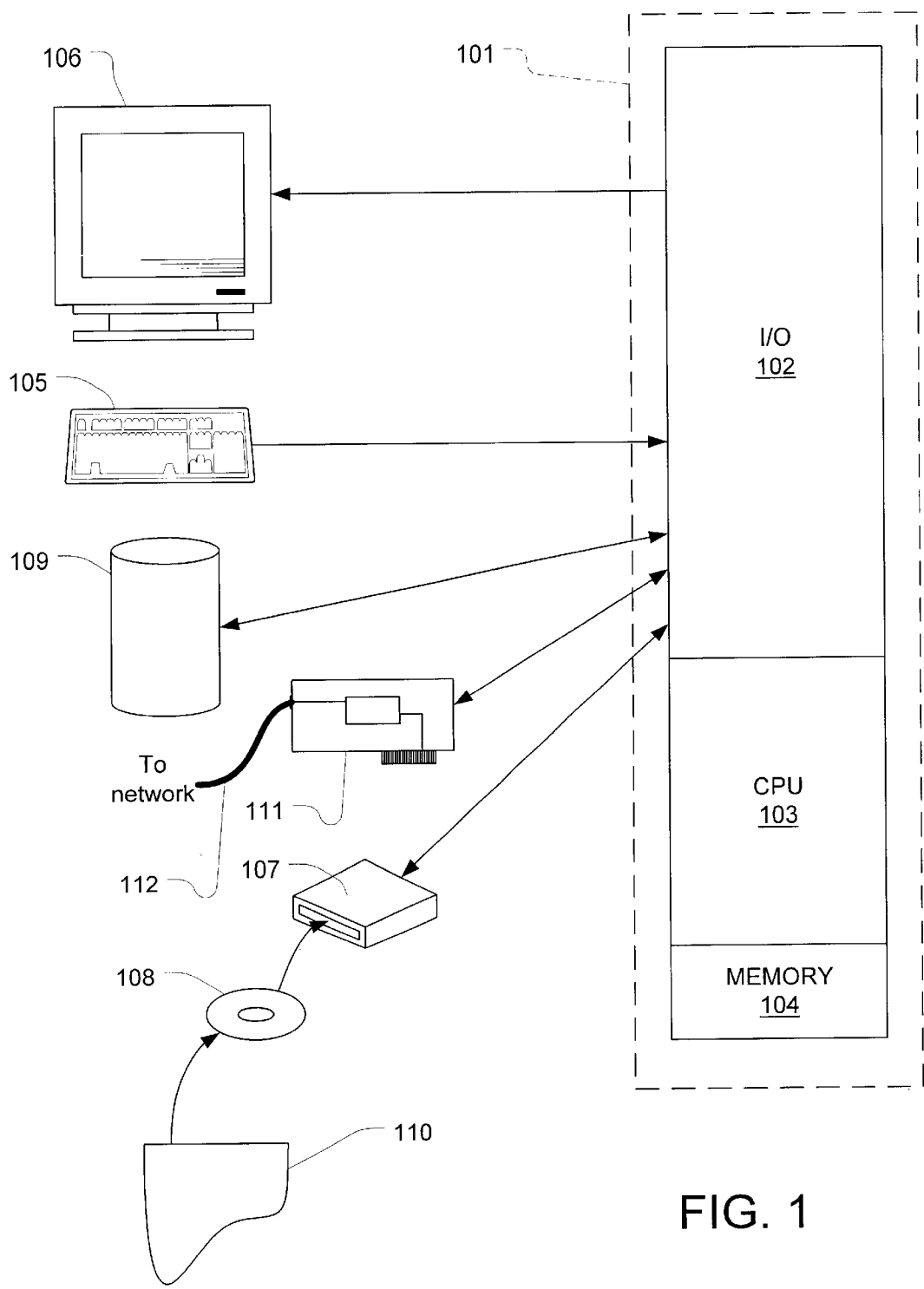
FIG. 1 depicts a general purpose computer that implements the logical operations of an embodiment of the present invention.

FIG. 1 depicts a general purpose computer capable of executing a program product embodiment of the present invention. One operating environment in which the present invention is potentially useful encompasses the general purpose computer. In such a system, data and program files may be input to the computer, which reads the files and executes the programs therein. Some of the elements of a general purpose computer are shown in FIG. 1 wherein a processor 101 is shown having an input/output (I/O) section 102, a Central Processing Unit (CPU) 103, and a memory section 104. The present invention is optionally implemented in software devices loaded in memory 104 and/or stored on a configured CD-ROM 108 or storage unit 109 thereby transforming the computer system in FIG. 1 to a special purpose machine for implementing the present invention.

The I/O section 102 is connected to keyboard 105, display unit 106, disk storage unit 109, and disk drive unit 107. Generally, in contemporary systems, the disk drive unit 107 is a CD-ROM driver unit capable of reading the CD-ROM medium 108, which typically contains programs 110 and data. Computer program products containing mechanisms to effectuate the systems and methods in accordance with the present invention may reside in the memory section 104, on a disk storage unit 109, or on the CD-ROM medium 108 of such a system. Alternatively, disk drive unit 107 may be replaced or supplemented by a floppy drive unit, a tape drive unit, or other storage medium drive unit. The network adapter 111 is capable of connecting the computer system to a network via the network link 112. Examples of such systems include SPARC systems offered by Sun Microsystems, Inc., personal computers offered by IBM Corporation and by other manufacturers of IBM-compatible personal computers, and other systems running a UNIX-based or other operating system. In accordance with the present invention, software instructions such as those directed toward communicating between a client and a server, providing a user interface, and accessing data and services may be executed by CPU 103, and data such as polling schedules, point and meter data, and rates may be stored on disk storage unit 109, disk drive unit 107 or other storage medium units coupled to the system.

Figure 2:
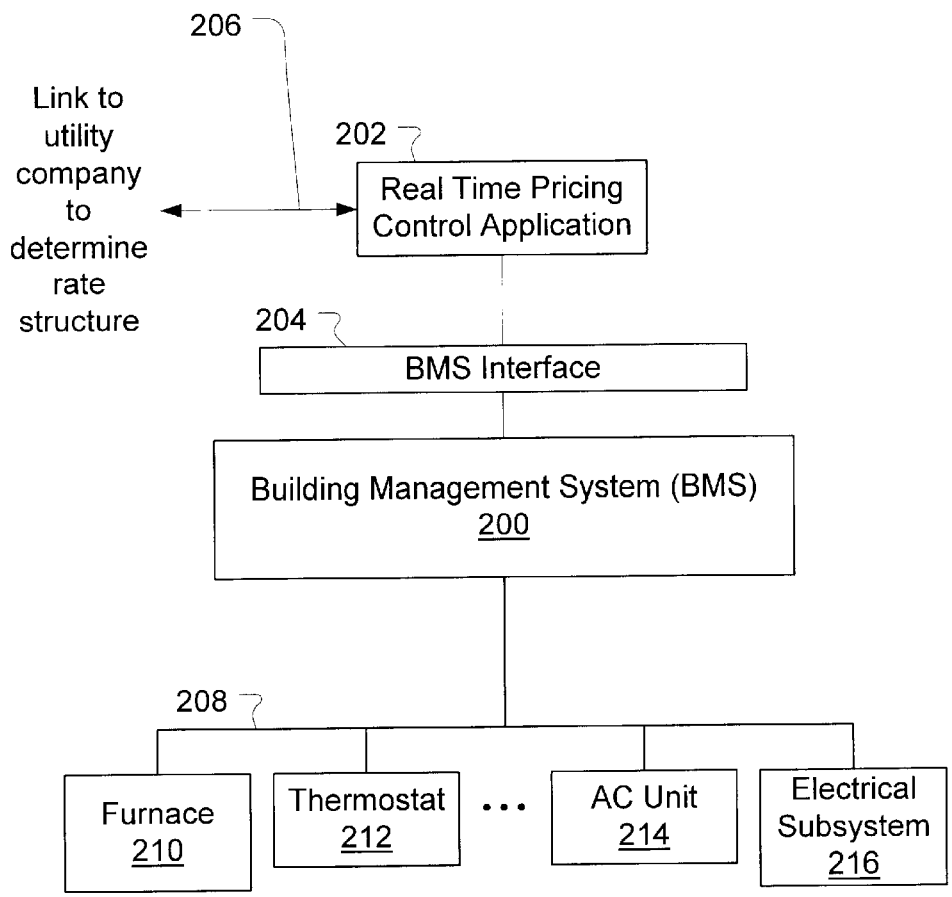
FIG. 2 depicts an embodiment of a building information system in accordance with the present invention.

FIG. 2 depicts a building information system including a BMS (building management system) coupled to an RTP (Real Time Pricing) control application in accordance with the present invention. A BMS 200 preferably comprises a personal computer, workstation, or server for executing a building management application. A BMS network 208 preferably couples to points and meters in building subsystems, such as a furnace 210, a thermostat 212, an air-conditioning (AC) unit 214, and an electrical subsystem 216. The BMS 200 provides and records dynamic point and meter data (e.g., building-related dynamic data) in association with point and meter IDs for points and meters located in building subsystems.

In addition, the computer executing the BMS 200 also executes an RTP control application 202 that enables energy service providers (ESPs) to download real-time rates on an incremental or ongoing basis to their customers. The RTP control application 202 is a distinct application from the BMS 200, but it depends on much of the same building-related dynamic data and many of the same interfaces as the BMS 200. The RTP control application 202 interfaces with the BMS 200 through a BMS interface 204 to allow a utility customer to analyze and adjust consumption, as feasible, in order to take advantage of the best utility rates. For example, a power company may charge higher rates during periods of greater demand as a way of encouraging changes in customer consumption, thereby helping the utility to better manage loads. Consequently, the RTP control application 202 allows a utility customer to download real-time rates from the utility company, to analyze its consumption based on the building-related dynamic data received through the BMS, and to adjust its energy consumption accordingly.

A link 206 provides communications to and from an ESP for determining the current rate structure. The ESP typically provides incremental prices (e.g., every hour or every fifteen minutes) to major customers in advance or on a real-time basis. The RTP control application 202 processes the rate data received from the utility in combination with dynamic consumption data, received from the BMS network 208 and recorded by the BMS system 200, to determine what changes should be made to the operation of the building subsystems coupled the BMS network 208. Preferably, data provided by the RTP control application 202 and provided by the BMS 200 is stored in a combined database with configuration data associated with the buildings on the BMS network 208. This integration of data and functionality is an exemplary embodiment of a building information system. As such, the BMS 200 and RTP control application 202 of FIG. 2 provide for a prompt, automatic, intelligent response that maximizes electrical savings without disturbing normal, effective building operations.

Figure 3:
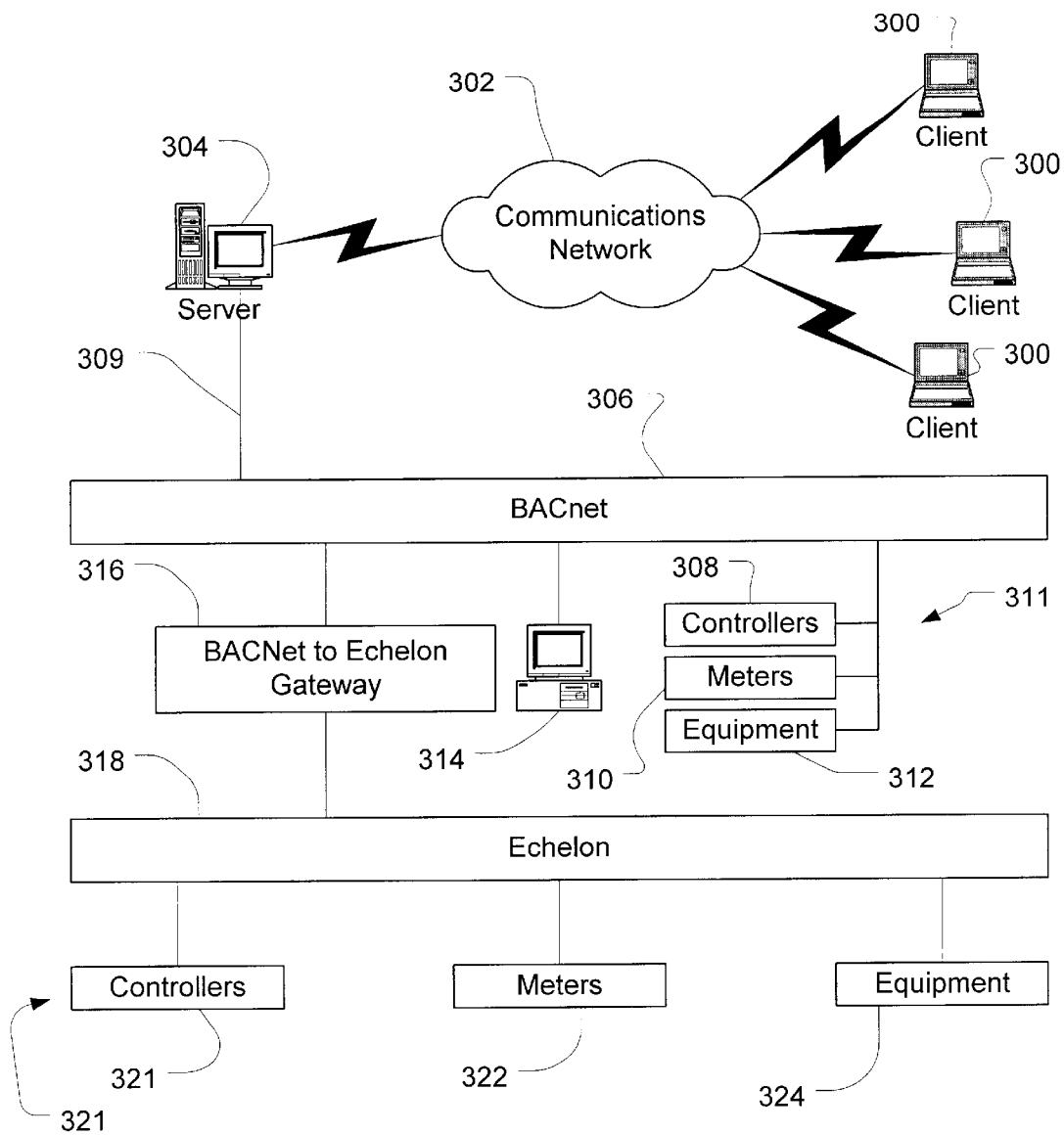
FIG. 3 depicts a network-based system for providing remote access to building management systems for monitoring and control of building subsystems.

FIG. 3 depicts an exemplary embodiment of a remotely accessible building information system that supports the integration of new tools and services. A client computer 300 is coupled to the server 304 via a communications network 302, such as an Internet, an extranet, or an intranet. Other network topologies, including dial-up connections, are also contemplated in accordance with the present invention. The server 304 is configured to communicate with one or more clients 300. Typically, the server 304 can support a number of protocols for communication, such as NetBEUI, NET-BIOS, IPX, TCP/IP, and Packet-Switching.

The server 304 is preferably coupled to a BACnet network 306 or another BMS network, such one supporting CEBus or Echelon. The server 304 can be coupled to the BACnet network 306 by a communications link 309, which may include without limitation a local connection (e.g., a serial cable), a network connection, or a dial-up connection. The controllers 308, the meters 310, and the equipment 312, generally referred to as BACnet-compliant building subsystems 311, are coupled to the BACnet network 306. A BMS 314 is coupled to the BACnet network 306 to monitor and control the BACnet-compliant subsystems 311. The server 304 may also communicate with the BMS 314 to initiate various BMS functions, such as monitoring and control of building subsystems 311. In addition, the server 304 preferably includes a database associatively storing at least two types of building-related data: (1) building-related BMS data (e.g., from BMS 314 or from an internally executing BMS service) and (2) building-related configuration data corresponding to the building subsystems.

In addition, the BACnet-to-Echelon gateway 316 in FIG. 3 provides an interface between the BACnet 306 and an Echelon network 318. The controllers 320, the meters 322, and the equipment 324, generally referred to as Echelon-compliant subsystems 321, are coupled to the Echelon network 318. By virtue of the services and interfaces supported in the server 304, the client 300 connects with the server 304 over the communications network 302 to manage and control the building subsystems coupled to the BMS or to obtain building-related dynamic data received from the BMS.

Figure 4:
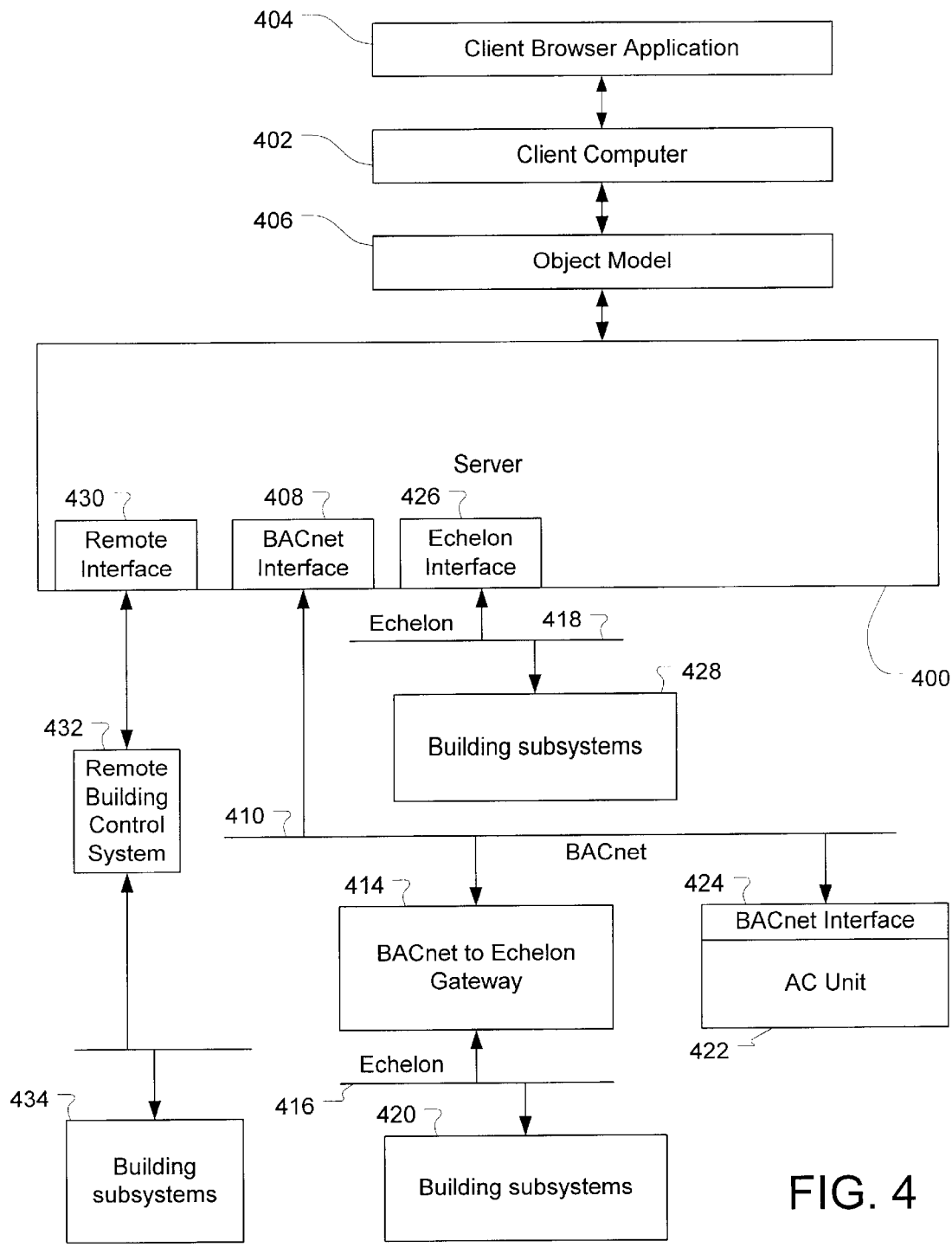
FIG. 4 depicts a block diagram of a client/server system in accordance with the present invention.

FIG. 4 depicts a block diagram of a client/server system in accordance with the present invention. The server computer 400 preferably executes interfaces and other programs that provide access to services and a database storing building-related BMS data and building-related configuration data. The client computer 402 preferably provides a user interface application (e.g., client browser application 404) and other associated applications (such as a report wizard) for accessing the server and monitoring and controlling the building subsystems. The client browser application 404 communicates with the server through a client interface, preferably in the form of an Object Model 406. The Object Model 406 is a client interface to components of the server computer 400, including a server-side client interface, a data interface, a BMS service, a service application, and other programs executing on the server computer 400. A BMS service and a service application preferably includes both server processes and client processes.

An Object Model is a model for binary code that enables a programmer to develop an object that can be accessed by any compatible Object Model, service or program. In a preferred embodiment, a Component Object Model (COM), developed by Microsoft Corporation, is used to provide access to other COM-compliant Object Models, including a COM-compliant Object Model in the server 400. The communications between the client computer and the server preferably occur over a communications network, such as the communication network 302 in FIG. 3.

Figure 5:
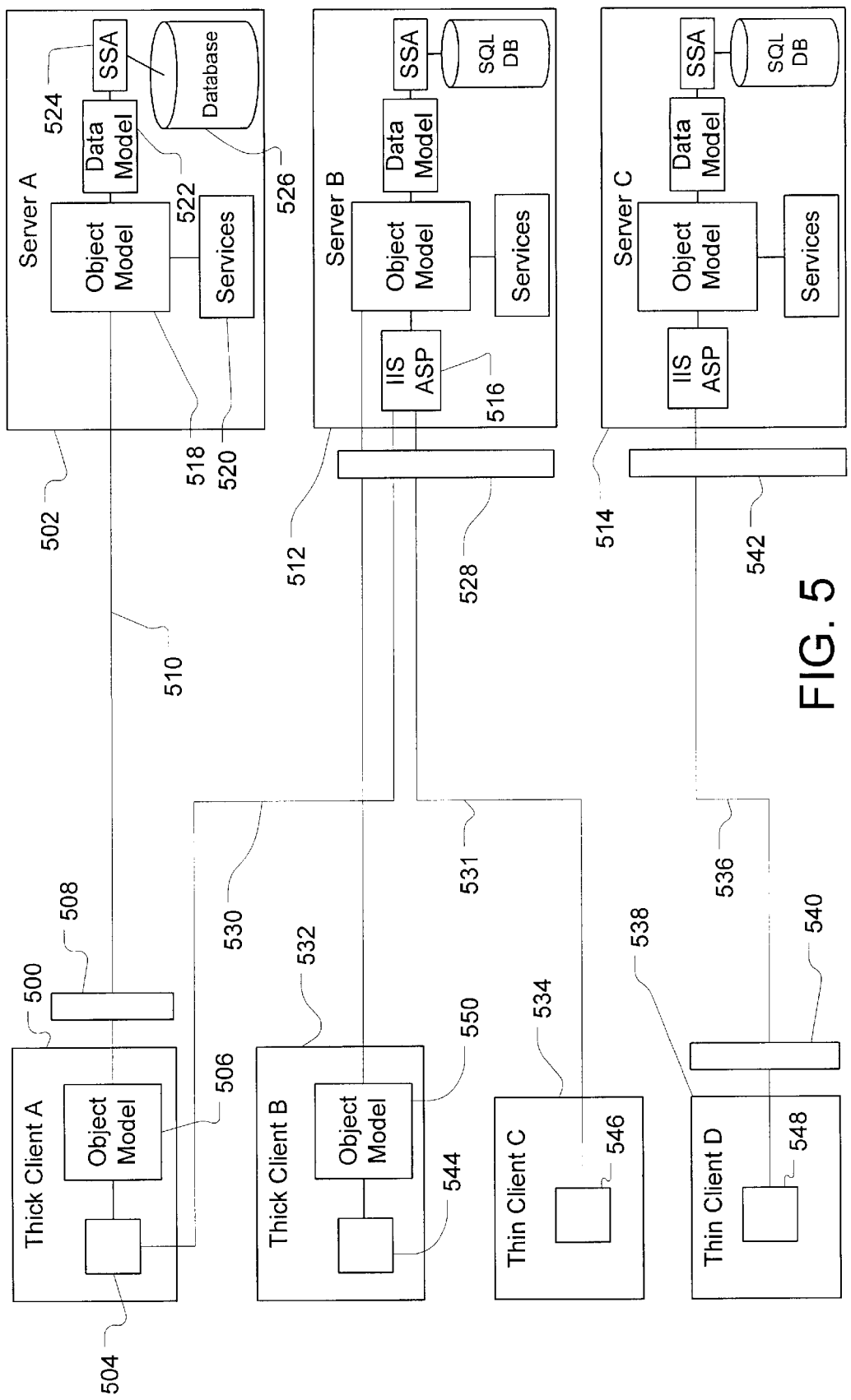
FIG. 5 depicts a topology of multiple clients and multiple servers as supported in an embodiment of the present invention.
Figure 6A:
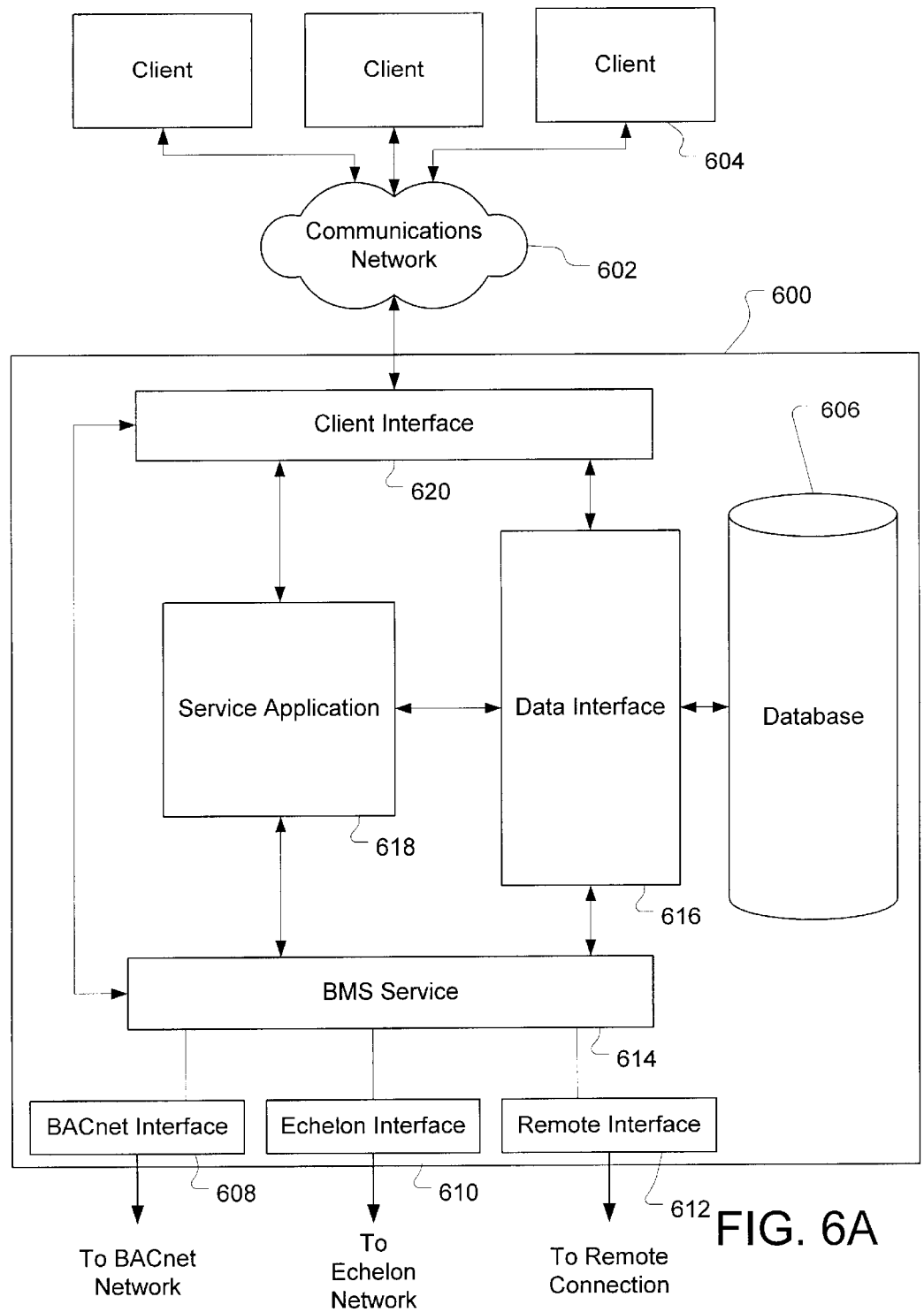
FIG. 6A illustrates a building information system in an exemplary embodiment of the present invention.
Figure 6B:
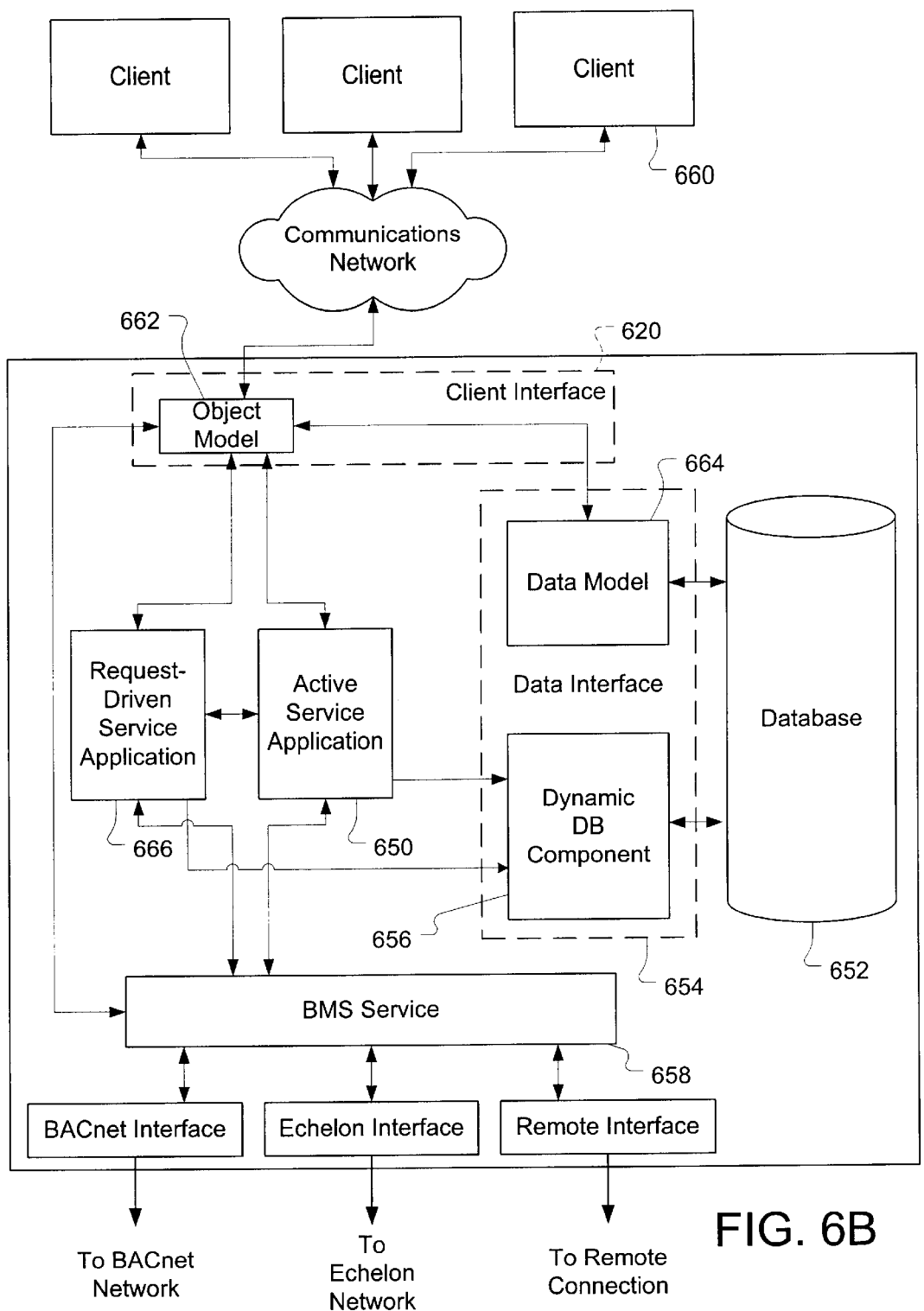
FIG. 6B illustrates a building information system in an alternative exemplary embodiment of the present invention.

The server 400 preferably comprises various services, at least one database, and one or more interfaces to other components of the building system (see FIGS. 5, 6A, and 6B). For example, the server 400 includes a BACnet interface 408 that complies with the BACnet standard and connects with a BACnet network 410. The server 400 also includes an Echelon interface 408 that complies with the Echelon standard and connects to the Echelon network 418. Building subsystems 428 are controlled over the Echelon network 418 and send building-related data back to the server 400. In the illustrated embodiment, the BACnet network 410 is coupled to a BACnet to Echelon Gateway 414 that interfaces to an Echelon network 416. The building subsystems 420 are controlled over the Echelon network and send building-related BMS data back to the server 400. The BACnet-compliant AC (air conditioning) unit 422 includes a BACnet interface 424 that couples to the BACnet network 410. The AC unit 422 sends building-related BMS data to the server 400. The server 400 also includes a remote interface 430 for coupling to other remote building control systems. For example, if the remote interface 430 is a dial-up interface, the remote building control system 432 includes a modem server for establishing communications with the remote interface 430. The server 400 can then monitor and control the building subsystems 434 in the remote building through a BMS service application executing in the server 400.

FIG. 5 depicts topologies of multiple clients and multiple servers as supported in an embodiment of the present invention. A client/server architecture is a system in which each computer or process on a network is either a "client" or a "server". Generally, a server is a process or computer that provides some service to other (client) processes or computers. For example, the BMS service and various service applications of the embodiments of the present invention include components that perform server processes for client processes within the system. Likewise, components of a client application, the BMS service and the various service applications also perform client processes. Clients are generally applications that rely on servers for processing and/or resources, such as files or devices. The connection between a client and a server is normally by means of message passing, often through a program interface or over a network employing a protocol to encode the client's requests and the servers' responses. The server may run continuously, such as a daemon or an NT service (i.e., active services), or await requests from other components (i.e., request-driven services).

The thick client A 500 represents a "fat client" in the client/server architecture. Generally a fat client is a client that performs large portion of the data processing operations, and the processed data is stored on the server, such as server A 502. The thick client A 500 comprises a client application 504 and a client-based Object Model 506. The client-based Object Model 506 provides an interface to the data, tools, and services on the server 502. The thick client A 500 communicates with server A 502 through a firewall 508 over communications link 510 using a remote procedure call (RPC) protocol. Generally, a firewall is a system designed to prevent unauthorized access to or from a private network. Firewalls can be implemented in both hardware and software, or a combination of both. Firewalls are frequently used to prevent unauthorized Internet users from accessing private networks connected to the Internet (especially intranets). All messages entering or leaving the intranet pass through the firewall, which examines each message and blocks those that do not meet the specified security criteria.

The server A 502 preferably includes a server-side Object Model 518, at least one services module 520, a Data Model 522, a storage system architecture (SSA) interface 524, and a database 526 residing on one or more storage media. The Object Model 518 is a server-side embodiment of an Object Model, similar to the client-side Object Model 506 in the client. The services 520 preferably include at least one software module for performing services, such as monitoring meters, computing rates and consumption, and polling points within the building system.

Generally, a Data Model is a set of tools to describe data, data relationships, and data constraints in the database 526. The SSA interface 524 preferably complies with an IBM proposed ANSI standard for standard-high speed interface to disk clusters and arrays. SSA allows full-duplex multiplex serial data transfers at rates of 20 megabits per second in each direction. The database 526 is preferably a structured query language (SQL) database for storing data relating to one or more buildings monitored and controlled by the building management system. The thick client A 500 is also coupled through firewall 528 to server B 512 using a hypertext transfer protocol (HTTP) link 530. The server B 512 also supports an RPC connection with the thick client B 532, which includes a client application 544 and a client-side Object Model 550, and HTTP connection 531 with a thin client C 534, which includes a client application 546.

Generally a thin client is a client in which much of the processing occurs at a server. The server B 512 preferably includes the same components as server A 502.

In FIG. 5, a server C 514 is also preferably coupled by an HTTP connection 536 to a thin client D 538, which preferably includes a client application 548. As shown, firewalls 540 and 542 are positioned between the thin client D 538 and the server C 514. The server C 514 preferably includes similar components to servers A and B. In servers B 512 and C 514, HTTP connections are coupled through an Internet information server (IIS) active server page (ASP) 516, which is a web server that runs on a Windows NT platform. Other web server implementations may also be employed in accordance with the present invention. The "ASP" refers to a specification for dynamically created web pages with a ASP extension that contain either Microsoft Visual Basic code or Jscript code.

FIG. 6A illustrates a building information system in an exemplary embodiment of the present invention. The server 600 is coupled to communications network 602, through which one or more client computers may access the server 600. Preferably, such a client 604 accesses the server 600 via an HTTP or RPC connection, although other client/server connection means are contemplated within the scope of the present invention. The client 604 preferably executes a browser application and other tools to facilitate the user's communication with the server and manipulation of data stored within the server.

The server 600 preferably includes a database 606 for storing building-related BMS data received from building subsystems (not shown) across a network, such as a BACnet network, an Echelon network, or other remote connections. The database 606 also includes building-related configuration data relating to the building subsystems coupled to the network. Preferably the building-related BMS data and the building-related configuration data are combined in a relational database such that the BMS data related to a particular point is associated with, for example, the corresponding building, building owner, equipment, and other configuration elements. To support a connection to a BMS network, a network interface is developed for the corresponding network (see interfaces 608, 610, and 612). Other proprietary networking protocols, such as CBUS from Honeywell, Inc., and other non-proprietary networking protocols, such as CEbus, may also be supported. A published and consistent interface to the BMS service 614 facilitates integration of these new interfaces.

The server 600 includes the BMS service 614 that preferably provides generic BMS functionality on the server-side, including the functionality to read/write points and point attributes, to discover building subsystems, and to discover objects (e.g., sensors, actuators, and meters) in building subsystems. The BMS service 614 also supports multiple BMS network interfaces, including a BACnet interface 608, an Echelon interface 610, and a remote interface 612. The BMS service 614 also communicates through a data interface 616, which preferably includes a Data Model (see 522 in FIG. 5). The data interface 616 abstracts database access functionality to the BMS service 614, one or more service applications 618, and a client interface 620, which preferably includes an Object Model (see 518 in FIG. 5). Generally, abstraction provides a consistent interface that preferably simplifies or automates access to an underlying database or object structure.

The service application 618 preferably comprises a Window NT service (i.e., an active service) or other component (i.e., a request-driven component), such as a service provided by a Microsoft Transaction Server (MTS), for servicing client commands, accessing the database 606, and communicating with building subsystems. The service application 618 is configured to communicate with the client 604 via the client interface 620. In an embodiment of the present invention, the service application 618 is also configured to access the database 606 through data interface 616 and/or through a combination of the client interface 620 and the data interface 616.

The architecture of the system illustrated in FIG. 6A facilitates integration of additional BMS network interfaces (such as BACnet interface 608), services (such as service application 618), and clients and associate tools (such as client 604). The published and consistent interfaces presented by the client interface 620, the data interface 616, and the BMS service 614 provide developers with a means to develop these new components to work with the existing system. As such, in contrast to dedicated BMS systems, additional tools can be added to the system to provide functionality beyond generic BMS functionality. In addition, the architecture provides remote accessibility across a communications network. Furthermore, security can be enforced upon these additional components (e.g., clients, services, and BMS network interfaces) by the interfaces (e.g., client interface 620, data interface 616, and BMS service 614) within the server 600.

FIG. 6B illustrates a building information system in an alternative exemplary embodiment of the present invention. An active service application 650 preferably interfaces with the database 652 through the data interface 654, and specifically through the dynamic database (DB) component 656, to store dynamic data in the database 652. An active service application typically has its own sense of time, such as a Windows NT service. Generally, the dynamic DB component 656 abstracts database update/write/delete operations. Also, the dynamic DB component 656 provides services to internal server components and, preferably, its interfaces are not published to external clients.

In an embodiment of the present invention, the active service application 650 and the BMS service 658 can also access the clients (such as client 660) and data in the database 652 through the Object Model 662. Preferably, certain data accesses by an active service application, such as a polling service's request for polling frequencies, are also communicated through the Object Model 662 in the client interface to the Data Model 664 to access data in the database 652.

In the exemplary embodiment of FIG. 6B, the request-driven service application 666 (e.g., the meter-BMS client 910 of FIG. 9) interfaces with the client interface 620 and the BMS service 658 and has access to the database 606 through the dynamic DB component 656. The request-driven service application 666 accesses the database 652 through the Object Model 662 in the client interface 620 and the Data Model 664 in the data interface 654. Furthermore, the request-driven service application 666 can also store dynamic data to the database via the dynamic DB component 656.

Figure 7:
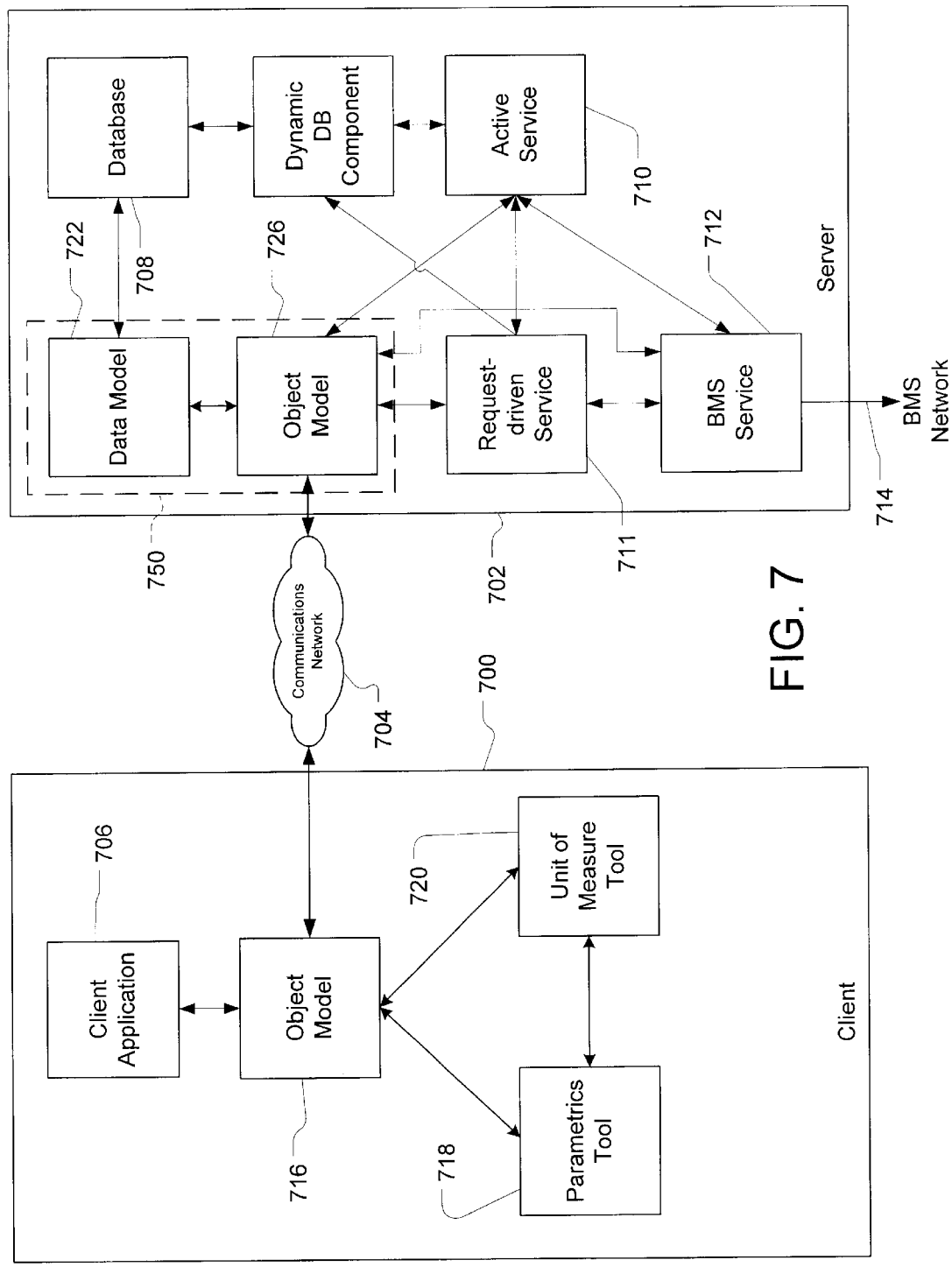
FIG. 7 depicts multiple client/server system topologies in accordance with the present invention.

FIG. 7 depicts a client/server system in accordance with the present invention. A client 700 is coupled to server 702 by communications network 704. Preferably, the communications network 704 is an Internet, an intranet, or an extranet. The client 700 preferably includes a client application 706, such as a browser for browsing data in database 708, for accessing services such as the active service 710, request-driven service 711, and the BMS service 712, and for monitoring and controlling equipment coupled to the server 702 via the BMS interface 714. The client application 706 interfaces with the server 702 via the client-side Object Model 716.

The parametrics tool 718 takes time series data (e.g., building-related dynamic data such as meter readings at 15 minute intervals) and interpolates, extrapolates, averages or otherwise process the data to determine estimated readings for times between or outside of the actual reading events. When data is requested that does not correspond to an actual reading event, the parametrics tool 718 determines, based on the units of measure associated with received data, whether estimation is appropriate. For example, consumption data can be evaluated based on a peak reading over a period of time, rather than an estimated reading at a specific moment in time. Therefore, for a particular embodiment of the present invention, the parametrics tool 718 is configured to recognize consumption data (based on its units of measure) and to pass the consumption data without estimating a peak value. A units of measure tool 720 can be invoked to convert building-related dynamic data from one unit of measure to another (e.g., degrees Fahrenheit to degrees Celsius). In an alternative embodiment, the parametrics tool 718 and the units of measure tool 720 may be executed by a server computer.

The Data Model 722 provides an interface for accessing and manipulating data in the database 708. Client applications preferably access the Data Model 722 through a server-side Object Model 726. The combination of the Data Model 722 and the Object Model 726 is referred to as the "DB component", as indicated by reference numeral 750. It is to this component, for example, that other COM-compliant client applications and services can be interfaced into the overall client-server architecture.

The Object Model 726 also provides the necessary functionality for clients to access underlying building-related BMS information (both building-related BMS data and building-related configuration data). For example, the Object Model 726, through communications with the BMS service 712, provides necessary methods for discovering devices and points, mapping such points to equipment, getting point data, setting sampling frequencies for points and setting sampling frequencies for a point or points based on multiple-client user access to a common point. The BMS service 712 preferably provides generic BMS functionality on the server-side to read/write points, to discover devices, discover objects in devices, and to read/write point attributes by interfacing with building subsystems on the BMS network.

The active service 710 may, for example, be embodied by a polling service that is responsible for getting dynamic point data from the BMS into the database 708. Preferably, the active service 710 runs as a Windows NT service. On startup, a polling service preferably retrieves all mapped points configured in the BMS along with a designated sampling frequency and point type. A polling service preferably sets up polling for active points (i.e., those points for which polling is enabled and selected). The polling service responds to polling frequency changes, changes to the polling on/off state (also referred to as the polling enable state), and changes to the mapped point configuration through a Windows NT event, based on configuration data in the database 708. Such changes are also reflected in an update to a cached list of points maintained in the polling service or database 708.

Preferably, a polling service supports the monitoring of multiple, different points on the one or more BMS networks. An embodiment of a polling service preferably spreads different point reads apart within a specified polling interval so as to limit the load on the BMS network. Alternatively, if the points are located on different BMS networks (see the multiple BMS networks of FIG. 4), the polling service preferably group schedules the multiple point reads closer together to minimize the frequency of inter-network or dialog communication. Point read failures are communicated using an alarms component. The polling service reads point data using the BMS service 712. The polling service 710 also uses a dynamic DB component to write dynamic data into the database, although other means of accessing the database 708 are also contemplated within the scope of the present invention.

Figure 8:
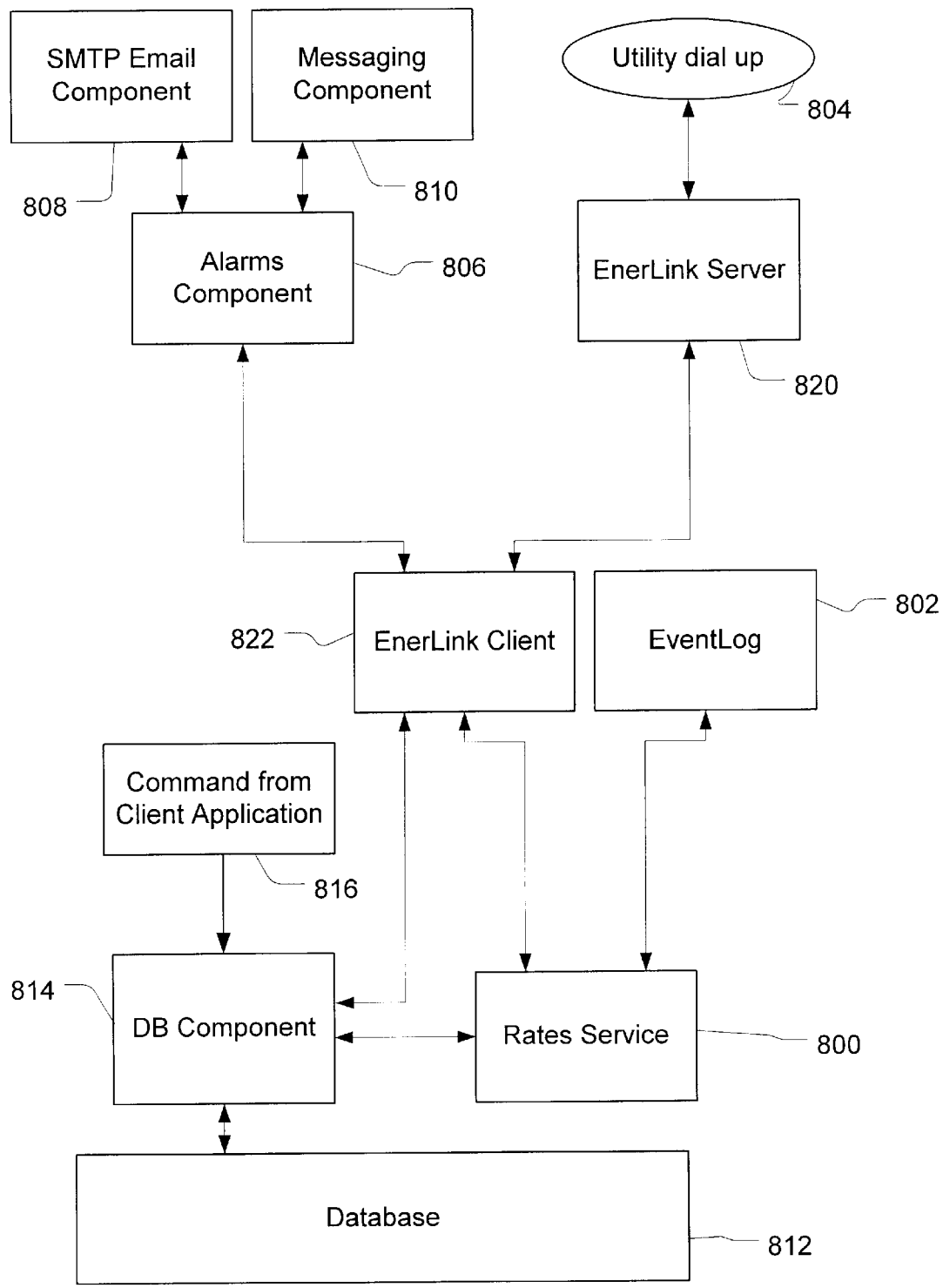
FIG. 8 depicts system components associated with a rates service in an embodiment of the present invention.

FIG. 8 depicts system components associated with a rates service in an embodiment of the present invention. Preferably, a rates service 800 is a Windows NT service that is responsible for periodically collecting real-time rates by interfacing with an underlying client for rate data from an ESP. The rates service 800 accesses the database 812 via the DB component 814 to store downloaded rates and consumption data. The rates service 800 is also configured to interface with multiple clients for different rate services, to retry rate collection in case of failures, and to set default rates in case of a failure to collect rates after a specified number of retried counts. The rates may be actual or predicted rates. Generally, clients access the database 812 through a DB component 814, as shown by the command 816 from a client application. The event log component 802 provides interfaces that abstract writing events to the Windows NT event log. Furthermore, the events can be reviewed through the Windows NT event viewer.

The EnerLink client 822 is one example of a rate source through which rates can be obtained. The EnerLink client 822 communicates with EnerLink Server 820, which provides the processing required to connect with and extract real-time prices from the ESP. A dial-up interface 804 provides an example of a means to connect with the utility to obtain real time pricing data, although other means, including the Internet and extranet or other connection means are contemplated within the scope of the present invention.

In case of a failure to obtain rates, the EnerLink client 822 is configured to dispatch an alarm through an alarms component 806. The alarms component 806 can dispatch alarms through an SMTP e-mail component 808 to send alarms by e-mail. More generally, error messages can be communicated using message component 810, such as by pop-up system messaging. The rates service 800 and the EnerLink client 822 are preferably both configured to access the database 812 through DB component 814.

Figure 9:
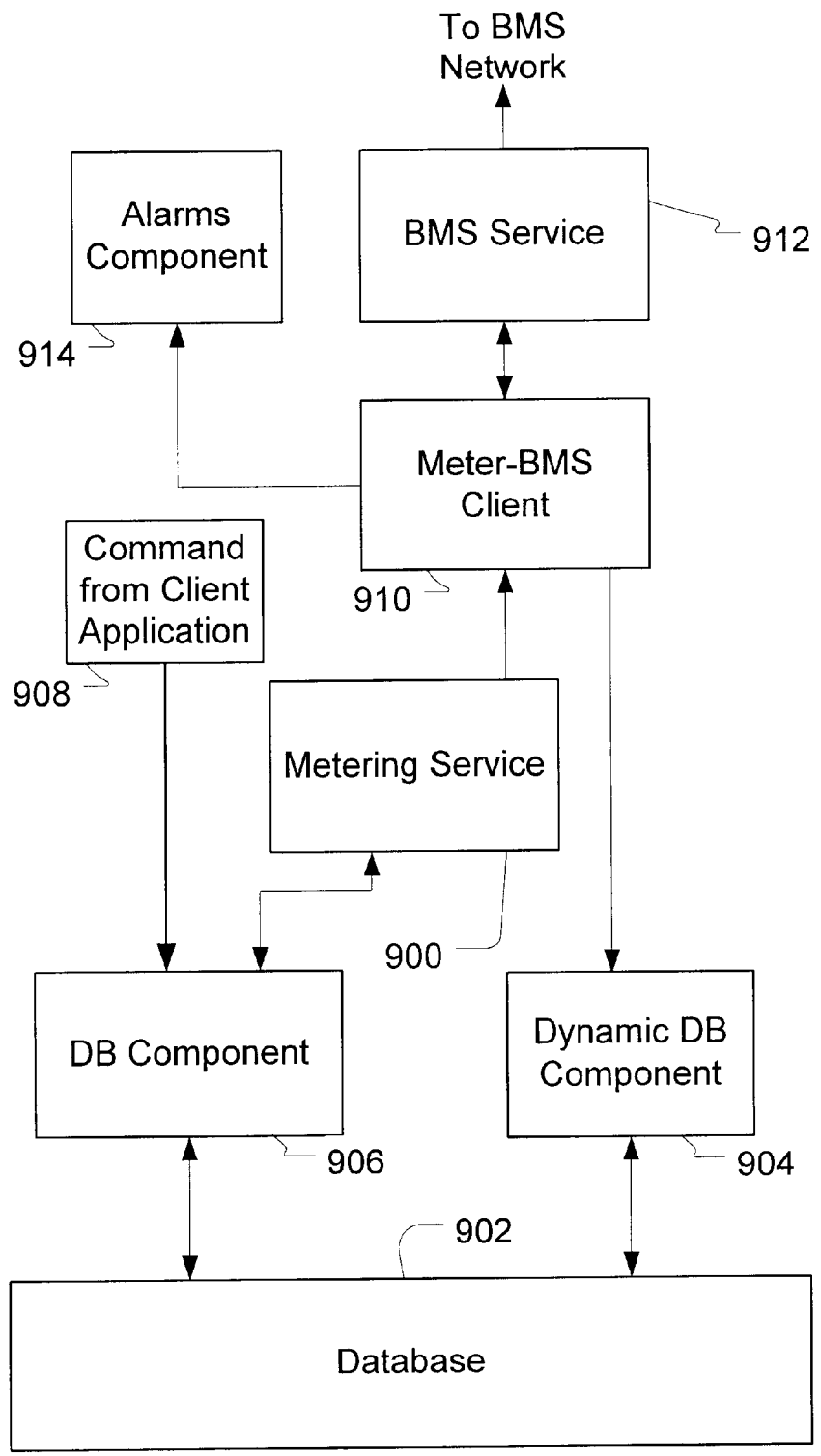
FIG. 9 depicts system components associated with a metering service in an embodiment of the present invention.

FIG. 9 depicts the components employed to support a metering service in accordance with the present invention. Preferably, the metering service 900 is an active service application, implemented as a Windows NT service. A metering service 900 is responsible for reading the meter data based on configuration information in a database 902. To accommodate different types of meters, the metering service 900 updates dynamic meter data in the database 902 via a meter-BMS client (a request-driven service application), which accesses the database 902 via a dynamic DB component 904. Furthermore, the metering service 900 also accesses configuration data in database 902 via a DB component 906, which preferably comprises an Object Model and a Data Model. A command 908 from a client application is communicated through the DB component 906 to access meter data in the database 902.

The metering service preferably provides functions for querying for a list of meters that are to be read, using the services of the DB component 906; segregating the list of meters based on meter types (BMS, CEBus, and others); scheduling the meter list of clients so that the meter reading intervals are spread evenly among the meters; maintaining the schedule list; polling at regular intervals the meter list maintained for each of the clients to determine whether there are any meters to be read; sending to each client a list of meters to be read on that client; waiting for configuration modification notifications; and modifying meter data in the meter list stored in the database 902. The metering service 900 accesses the BMS service 912 through the meter-BMS client 910. The meter-BMS client 910 provides necessary functionality for retrieving meter data (i.e., by reading the meter) from different types of meters that are connected to the BMS network. The meter-BMS client 910 can also initiate alarms through the alarm component 914 and is configured to compute consumption, demand, and other meter-related characteristics based on pulse count in accordance with predetermined algorithms. In an alternative embodiment, the data interface includes the functionality for computer consumption, demand, and other meter-related characteristics.

Figure 10:
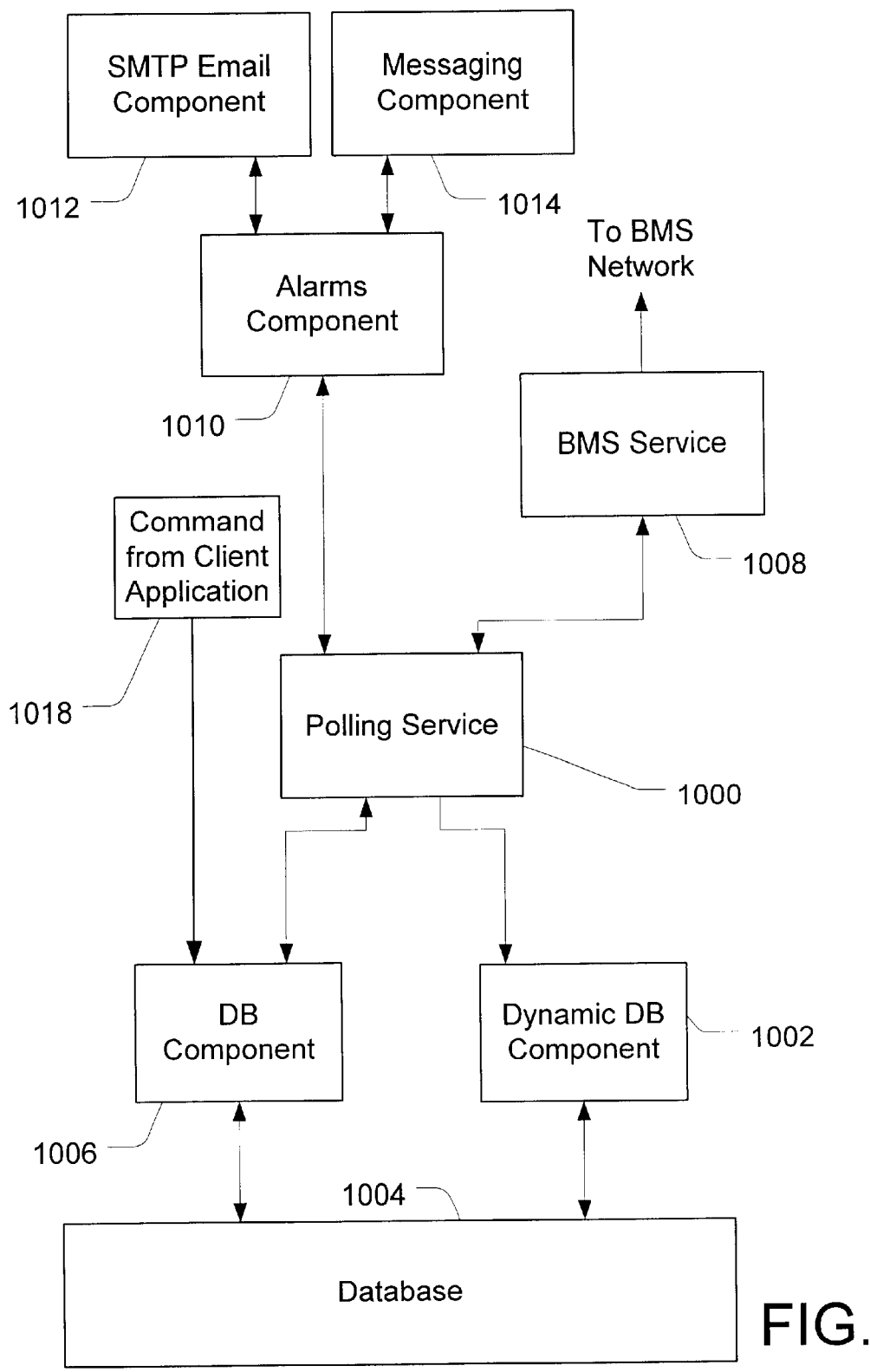
FIG. 10 depicts system components associated with a polling service in an embodiment of the present invention.

FIG. 10 depicts components employed to support a polling service in accordance with the present invention. The polling service architecture is responsible for getting dynamic point data from a BMS service 1008 and recording it into a database 1004. Preferably, the polling service 1000 is an active service application, implemented as a Windows NT service. On startup, the polling service 1000 retrieves all mapped points configured in the database 1004 along with each point's sampling frequency, polling enable state, point type, and other relevant data. The polling service 1000 configures polling for active points (i.e., those points for which polling is enabled). Generally, polling involves requesting point data from the BMS service 1008 at a predetermined frequency or on a time schedule. When the BMS service 1008 responds with the requested data, the polling service 1000 records the dynamic point data in the database 1004 via the dynamic DB component 1002. The polling service 1000 distributes point read calls to the BMS service 1008 over a designated frequency period. The polling service 1000 also responds to polling frequency changes, changes to polling enable states, and mapped point configuration changes. Such changes are initiated by command 1018 from a client application, either on a separate client computer or a client application internal to the server. Such changes are communicated by a Windows NT event to which the polling service 1000 responds and updates the cache list of points. The command 1018 is communicated through DB component 1006 to make changes to the point data stored in the database 1004.

If a point read failure occurs, the polling service 1000 communicates the failure to other components in the system using an alarms component 1010. The alarms component preferably obtains a recipient list according to an identifier associated with the particular alarm. In an embodiment of the present invention, the recipient list is stored as configuration data in the database 1004 and includes fields associated with the names of one or more recipients, an indicator of the preferred alarm communication method (e.g., e-mail, fax, pager, or event log), a textual, tactile, graphical or auditory message to be communicated to the recipient, and a time schedule indicating when the recipient should receive an alarm communication. For example, a recipient who works during a first shift may have a time schedule indicating that they are to receive alarms from seven o'clock to four o'clock Monday, Tuesday, Wednesday, Thursday and Friday.

The alarm functionality and the configuration data from the database 1004 on which it relies, provide an excellent illustration of the advantages provided by combining BMS data with building-related configuration data. Whereas in a standard BMS system, a limited scope and quantity of BMS data is associated with a specific point or meter (e.g., as identified by the point attributes), the building information system of the present invention relates the BMS data to real-world configuration data that allows information calculations and other functionality to be integrated for the benefit of the building operator. For example, if configuration data includes layout data regarding an air conditioning unit having current sensor, the power consumption for the air conditioning unit can be calculated by the building information system. The layout data preferably indicates the supply voltage level, or the identity of the voltage source, coupled to the air conditioning unit and, therefore, allows the building information system to calculate power consumption from the detected current value and the supply voltage determined from the configuration data (power= voltage times current).

The alarms component 1010 communicates an alarm via an SMTP e-mail component 1012 or via a messaging component 1014. The SMTP e-mail component 1012 is an in-proc DLL that can send e-mail messages to one or more recipients. This component uses sockets and an SMTP host to send an e-mail. Preferably, the SMTP mail component 1012 is an active server page (ASP) component that can be hosted with an IIS. The messaging component 1014 provides necessary services to send messages, including e-mail, pages, faxes, or entries in an event log.

Figure 11:
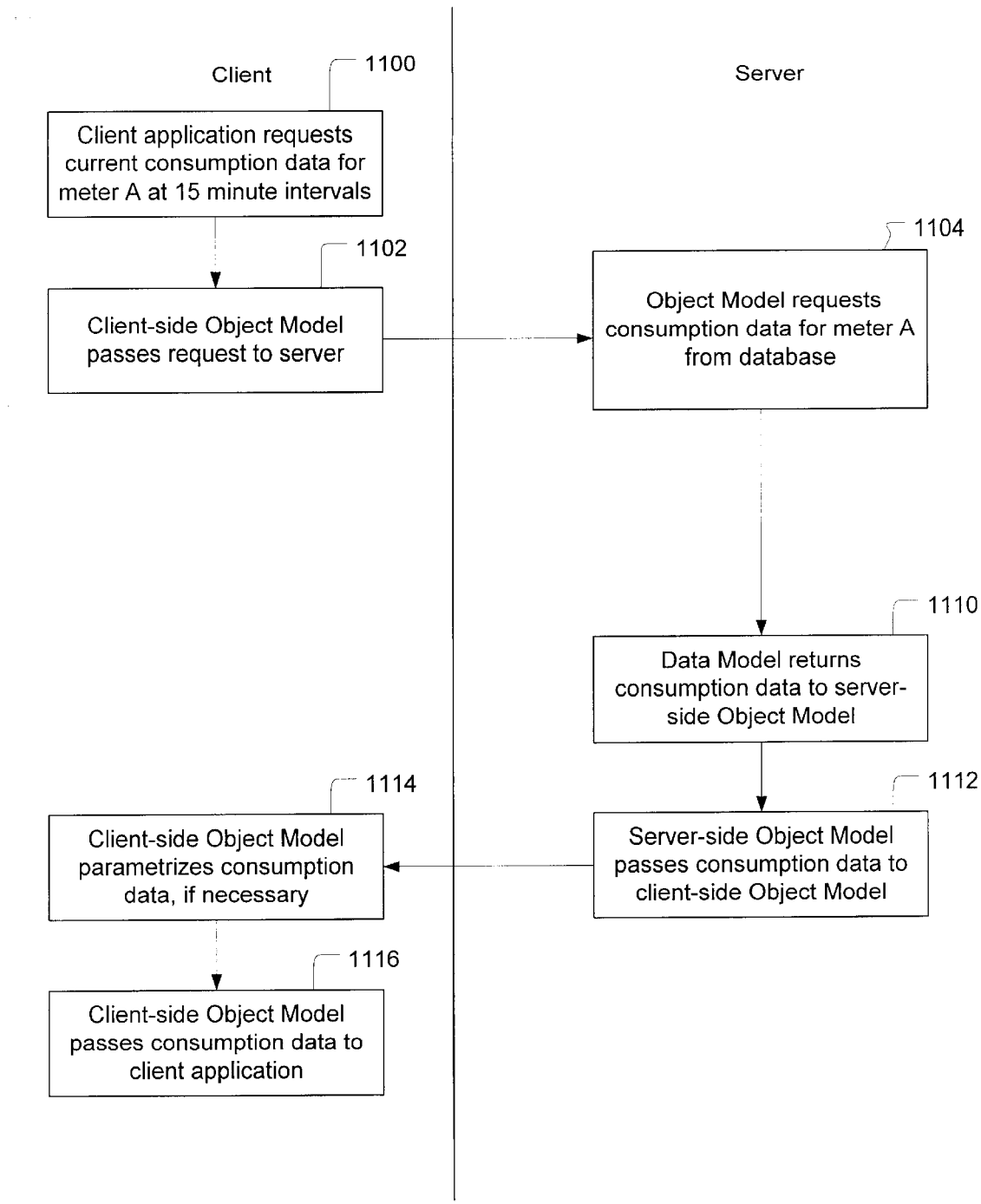
FIG. 11 depicts a flowchart of communications relating to a request for dynamic meter data in an embodiment of the present invention.

FIG. 11 depicts a flowchart of communications relating to a request for dynamic meter data in an embodiment of the present invention. The left side of FIG. 11 relates to operations preferably occurring in a client, such as client computer 402 in FIG. 4. The right side of FIG. 11 corresponds to operations occurring on a building information server, such as server computer 400 in FIG. 4. It is assumed that a metering service was previously requested to request consumption data for meter A from a BMS service, such as the BMS service 614 in FIG. 6A, at 15 minute intervals. The BMS service retrieves the consumption data from meter A on the BMS network at the appropriate interval and dynamically loads it into a database.

In operation 1100, a client application requests current energy consumption data relating to meter A. Meter A represents a meter coupled to a BMS network attached to the server. In operation 1102, the request is passed by a client-side Object Model to the server. In operation 1104 on the server-side, a server-side Object Model receives the request from the client-side Object Model and requests the energy consumption data for meter A from the database.

Preferably, the dynamic meter data is stored in the database in accordance with read requests by a metering service. For example, prior to the client request of 1100, the client application requested that a meter reading frequency of ten minute intervals be configured for meter A. The request was passed through the Object Models and the ten minute interval was stored in the database. The metering service accesses the database and determines that a meter reading frequency has been configured for meter A. Thereafter, the meter service causes the BMS service to read the meter A at ten minute intervals. The dynamic data result from each meter reading is then loaded by the BMS server through the dynamic DB component into the database. Once in the database, the dynamic data can be retrieved by the client application in accordance with the flowchart of FIG. 11.

In operation 1110, a Data Model retrieves the consumption data from the database and returns it to the server-side Object Model. In operation 1112, the server-side Object Model passes the consumption data to the client-side Object Model. In operation 1114 on the clientside, the client-side Object Model passes the consumption data to the parametrics tool (see parametrics tool 718 in FIG. 7). Typically, the parametric tool is used to interpolate between individual meter reads (such as meter reads spaced at fifteen minute intervals) to estimate consumption at smaller time intervals. For example, in operation 1116, the client-side Object Model passes the consumption data to a client application, which preferably displays the consumption data to a user or otherwise operates on it.

Figure 12:
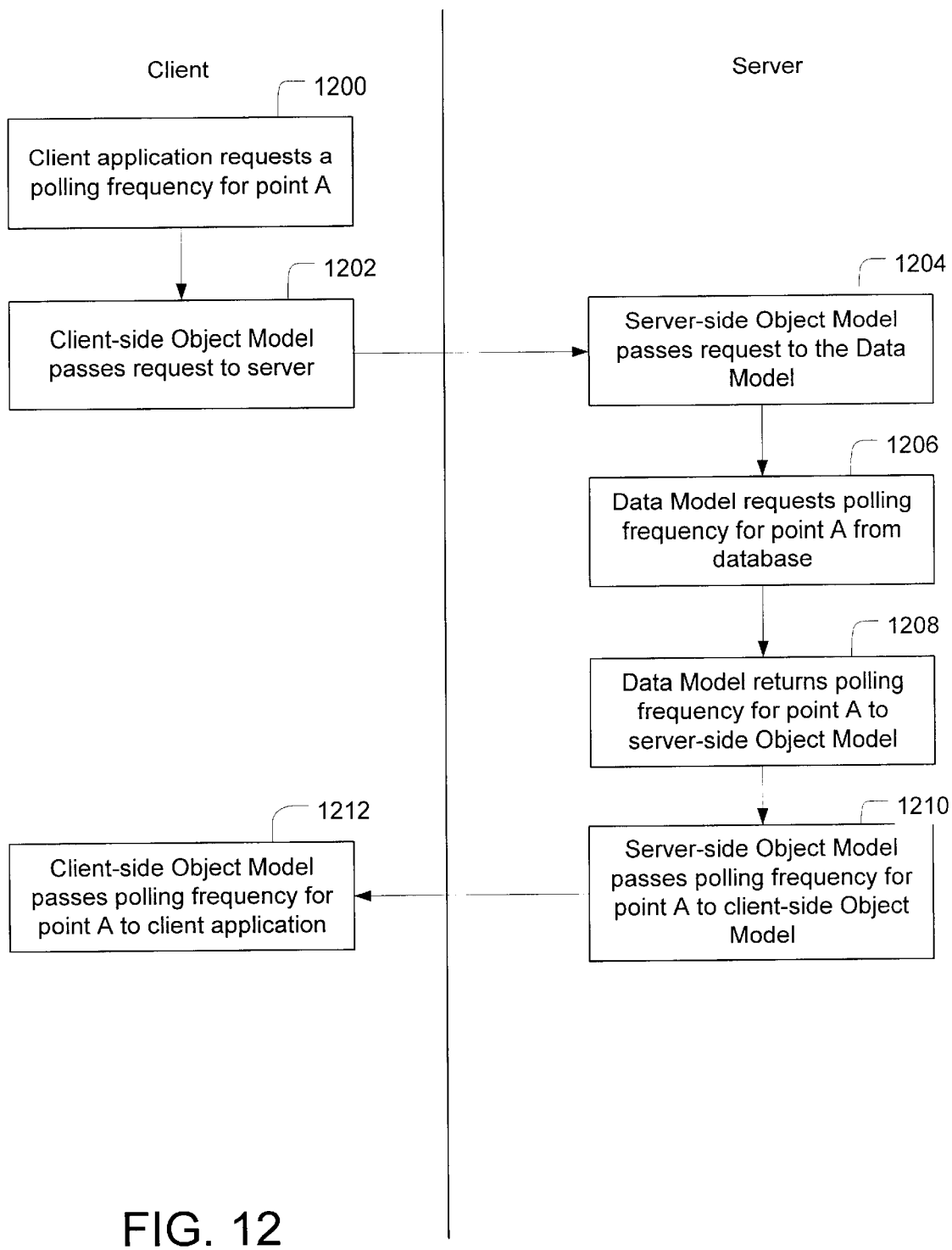
FIG. 12 depicts a flowchart of communications representing a request by a client application for configuration data from a database in an embodiment of the present invention.

FIG. 12 depicts a flowchart of communications representing a request by a client application for configuration data from a database in an embodiment of the present invention. In operation 1200, the client application requests a polling frequency of point A. In addition to configuration data such as a polling frequency, other data, including without limitation, the owner of the building, the building location, recipient lists for alarms, rates, and relationships between BMS data and other configuration data may be requested in accordance with the flowchart of FIG. 12. In operation 1202, the client-side Object Model passes the request to a server.

In operation 1204 on the server-side, the server-side Object Model passes the requests to the Data Model. In operation 1206, the Data Model requests the polling frequency for point A from the database. In operation 1208, the Data Model returns the polling frequency for point A to the server-side Object Model. In operation 1210, the server-side Object Model passes the polling frequency for point A to the client-side Object Model. In operation 1212 on the client-side, the client-side Object Model receives the polling frequency for point A from the server-side Object Model and passes it to the client application.

Figure 13A:
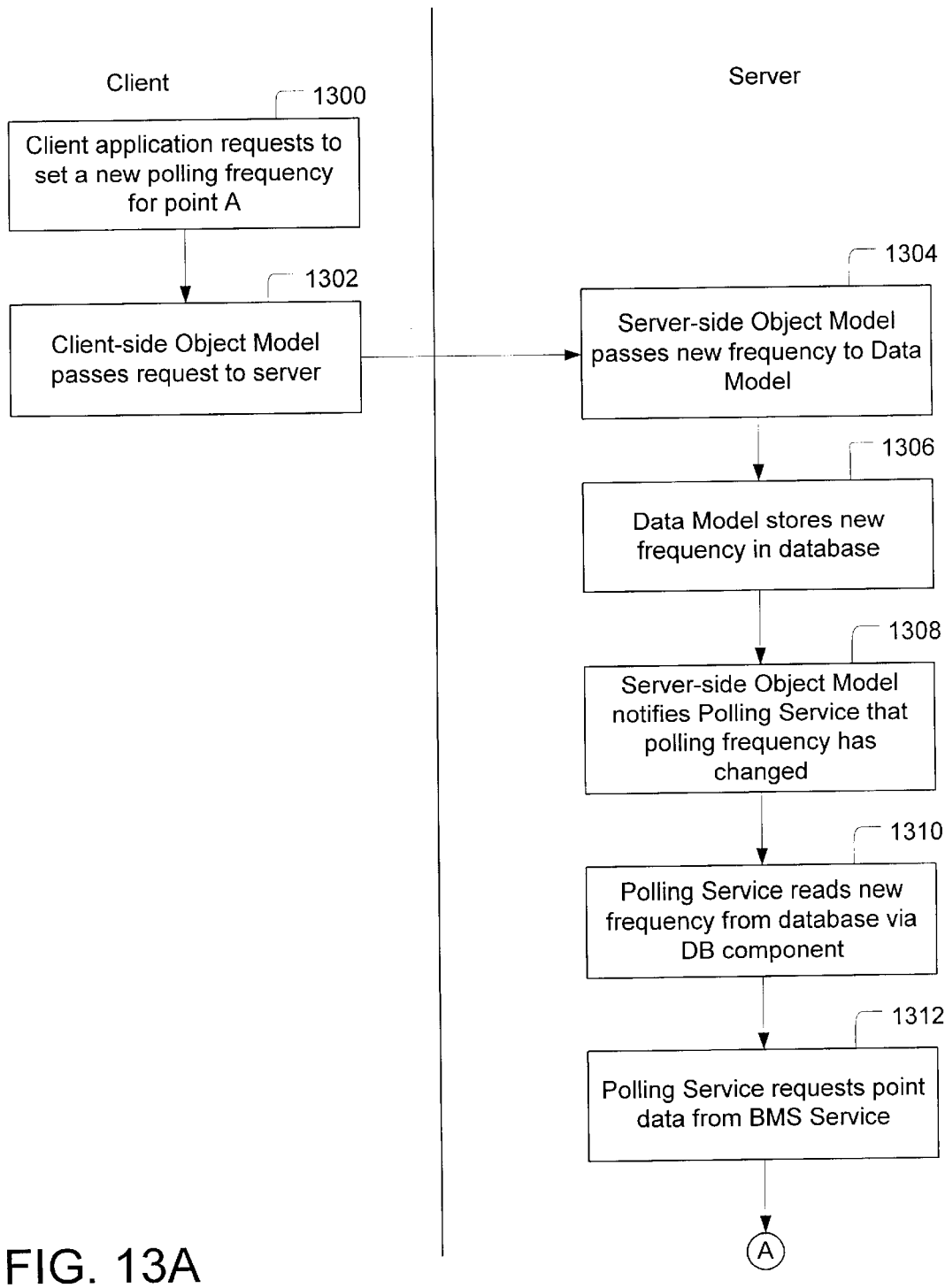
FIGS. 13A and 13B depict a flowchart of communications relating to setting a new polling frequency for a point in an embodiment of the present invention.
Figure 13B:
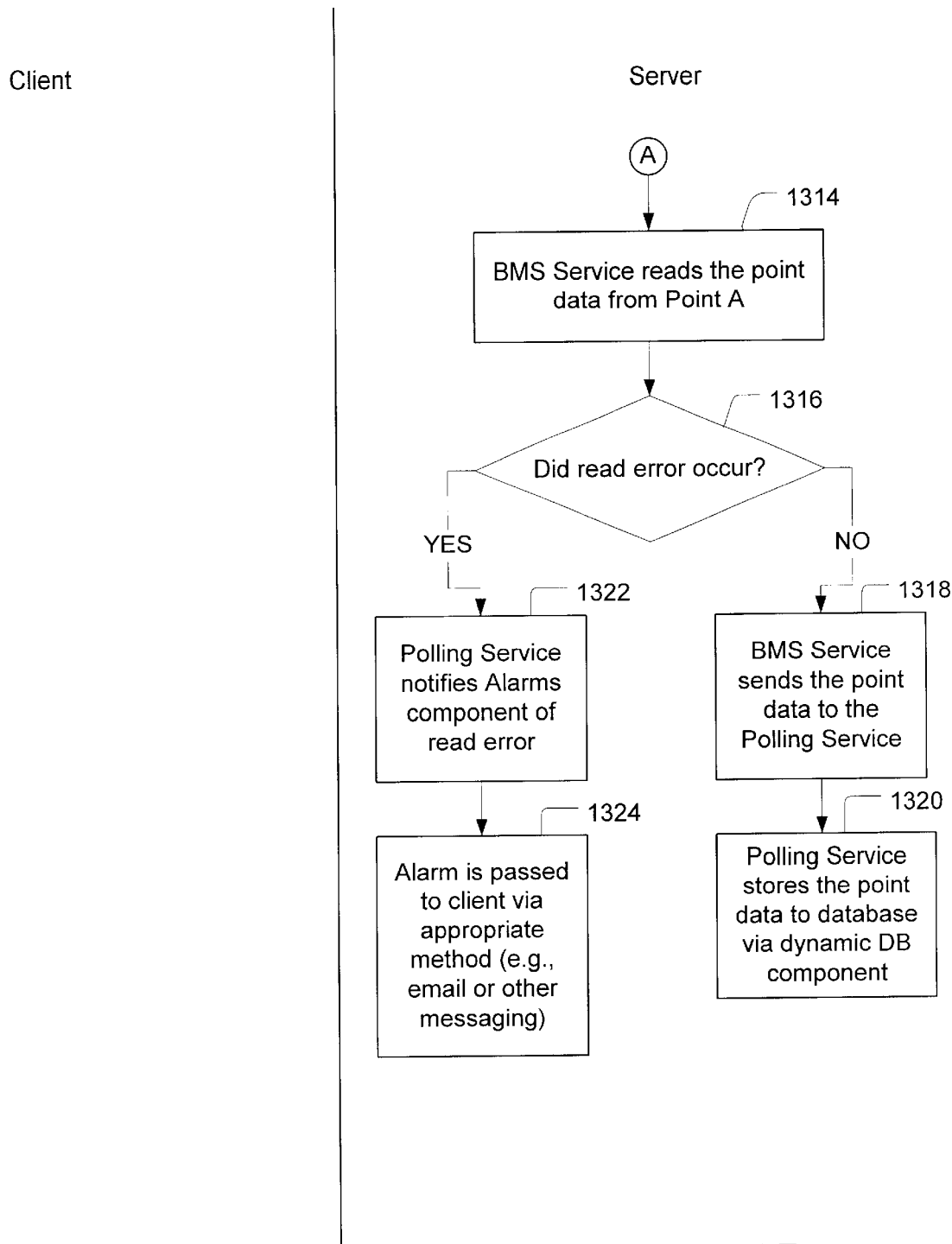

FIGS. 13A and 13B depict the communications relating to setting a new polling frequency for a point in an embodiment of the present invention. In operation 1300, the client application requests to set a new polling frequency for point A. In operation 1302, the client-side object Model passes the request to the server.

In operation 1304 on the server-side, the server-side Object Model passes the new frequency, which was passed as a parameter in the request, to the Data Model. In operation 1306, the Data Model stores a new frequency in the database. In operation 1308, the server-side Object Model notifies the polling service that a polling frequency has changed. In an embodiment of the present invention, operations 1304 and 1308 are performed concurrently. In operation 1310, the polling service reads the new frequency from the database via the DB component, which preferably comprises the server-side Object Model and the Data Model. In operation 1312, the polling service requests point data from the BMS service in accordance with the new polling frequency.

In operation 1314, the BMS service reads the point data from point A. Operation 1316 determines whether a read error occurred. If a read error did not occur in operation 1318, the BMS service sends the point data to the polling service. In operation 1320, the polling service stores the point data to the database via the dynamic DB component. If a read error was detected in operation 1316, processing proceeds to operation 1322, where the polling service notifies an alarm component of the read error. In operation 1324, an alarm is passed to a client by an appropriate method (e.g., an e-mail or other messaging method) using configuration data from the database to identify recipients and describe the failure.

Figure 14A:
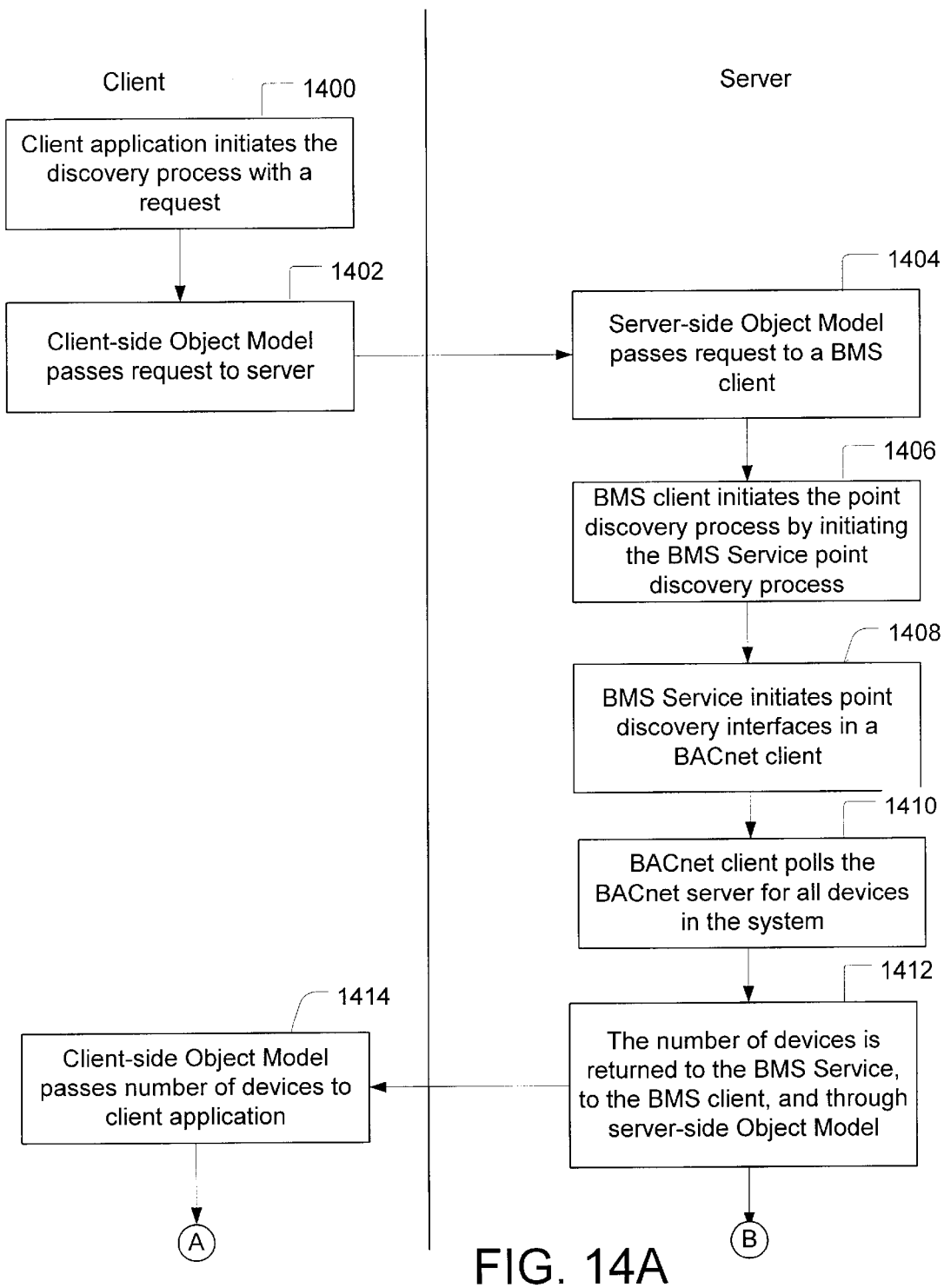
FIGS. 14A, 14B and 14C depict a flowchart of communications relating to the discovery of points coupled to the client/server system in an embodiment of the present invention.
Figure 14B:
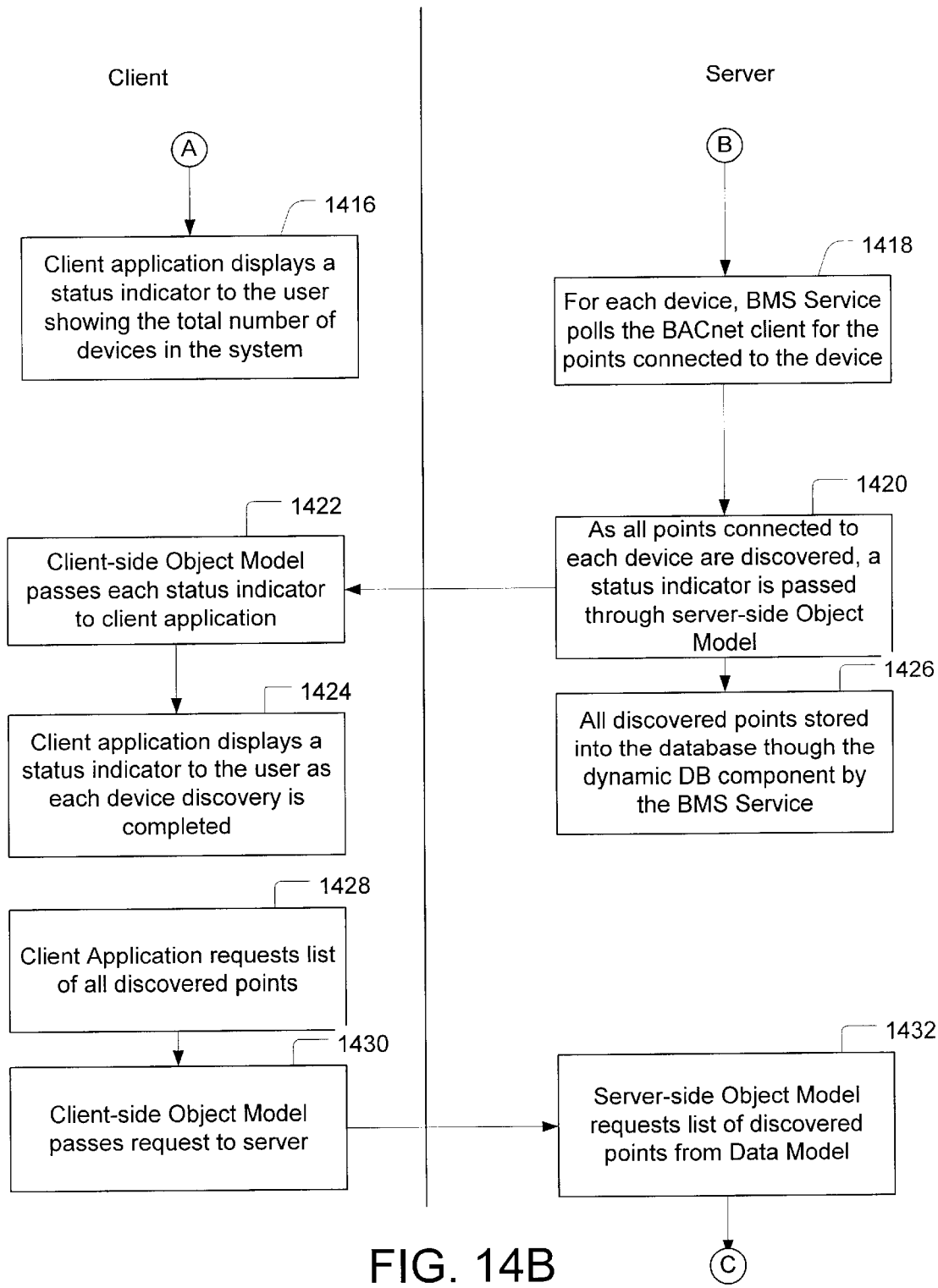
Figure 14C:
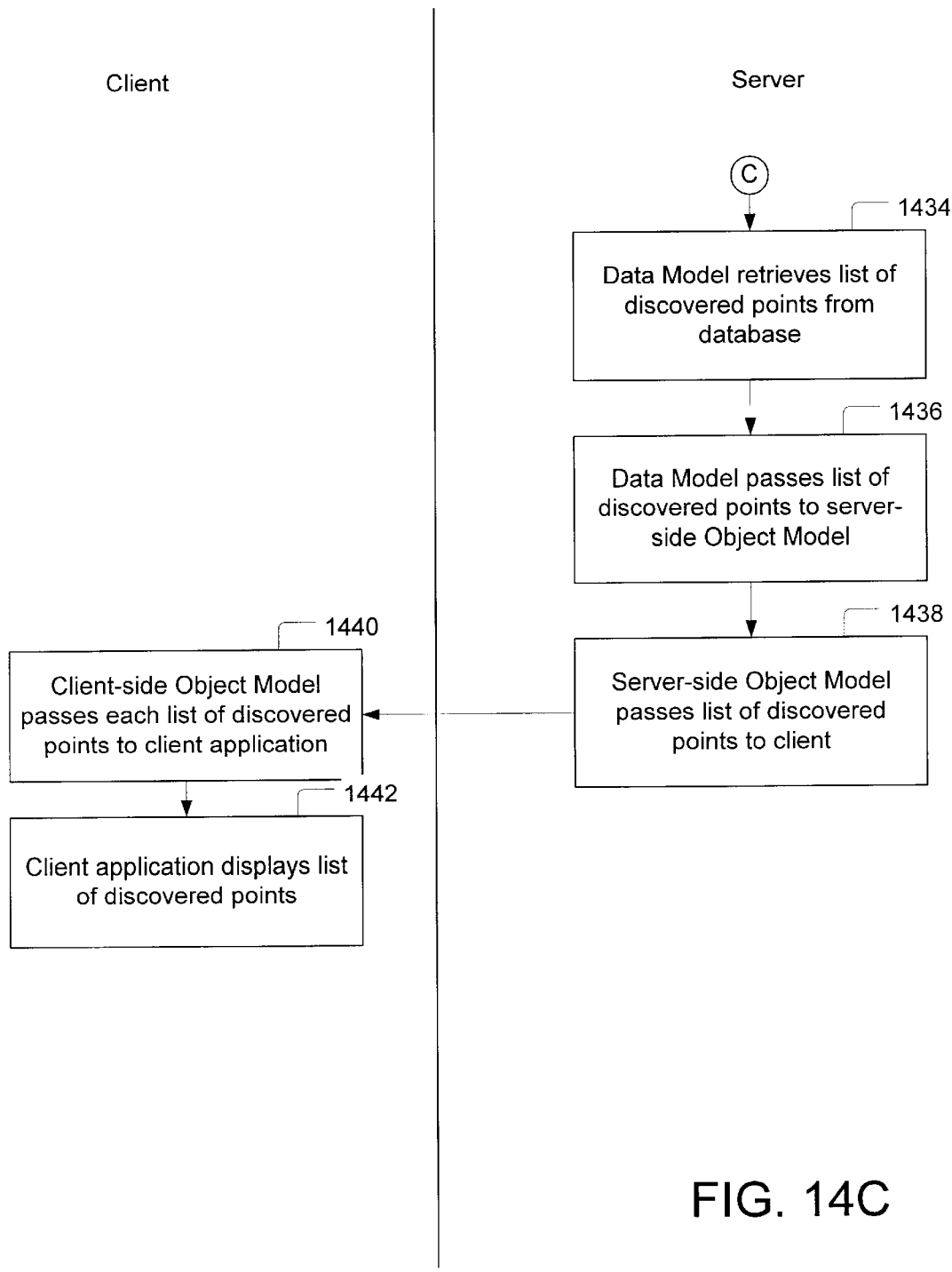

FIGS. 14A, 14B and 14C depict a flowchart of communications relating to the discovery of points coupled to the client/server system in an embodiment of the present invention. In operation 1400, the client application initiates the discovery process for the request. In operation 1402, the client-side Object Model receives the request and passes it to the server. In operation 1404 on the server-side, the server-side Object Model receives the request and passes it to a BMS client component of the BMS service. In operation 1406, the BMS client component initiates the BMS service point discovery process. In operation 1408, the BMS service initiates the point discovery interfaces in a BACnet client component. In operation 1410, the BACnet client component polls the BACnet server for all devices in the system. In operation 1412, the number of devices detected by the BACnet server are returned to the BMS service, to the BMS client, and through the server-side Object Model to the client-side Object Model. In operation 1414, the client-side Object Model receives the number of devices and passes it to the client application. In operation 1416, the client application displays a status indicator to the user showing the total number of devices in the system.

In operation 1418, the BMS service polls the BACnet client for the points connected to each device in the system. In operation 1420, as all points connected to each device are discovered, a status indicator is passed through the server-side Object Model to the client indicating that point discovery from that device is completed. In operation 1422 on the clientside, the client-side Object Model receives the status indicator and passes it to the client application. In operation 1424, the client application displays a status indicator to the user as each device discovery is completed. In operation 1426, all discovered points are stored into the database through the dynamic DB component by the BMS service.

In operation 1428, the client application requests a list of all discovered points. In operation 1430, the client-side Object Model receives the request and passes it to the server. In operation 1432 on the server-side, the server-side Object Model requests a list of discovered points from the Data Model. In operation 1434, the Data Model retrieves the list of discovered points from the database. In operation 1436, the Data Model passes the list of discovered points to the server-side Object Model. In operation 1438, the server-side Object Model passes the list of discovered points to the client. In operation 1440, the client-side Object Model receives the list of discovered points and passes it to the client application. In operation 1442, the client application displays the list of discovered points to a user.

In another embodiment of the present invention, the point discovery process is combined with a point mismatch alarm component that compares a first array of discovered points determined at a previous time with a second array of discovered points determined at a current time. The first array is preferably stored in the database and accessed by the point mismatch alarm component for comparison with the second array. If the arrays do not match, then the alarm component notifies an appropriate person (such a building operator) or service that a point mismatch is detected in accordance with a recipients list in the database. If the mismatch involves a point that is indicated in the first array but not the second array, the alarm indicates that a point is no longer responding to the discovery request, which may result from a malfunction of the corresponding equipment, a fault in the BMS network, and other events within the system. Alternatively, if the mismatch involves a point that is indicated in the second array but not the first array, the alarm indicates that a new point has been discovered. For example, the "new point" alarm may notify a person or service to map the new point using the schematic mapping capability of an embodiment of the present invention.

The scope of the present invention is not limited to the exemplary embodiments described herein, including heating ventilation, air conditioning, and lighting. Without departing from the present invention, additional embodiments may be directed to other building subsystems and databases, including without limitation photocopier subsystems, printer subsystems, vendor and contact databases, laundry subsystems, and cafeteria-oriented subsystems and services.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A building information system for communicating building-related data associated with a building with a client application, the system comprising:
    a database storing the building-related data including building management system (BMS) data and configuration data associated with the building;
    a building management system service managing a building subsystem and providing the BMS data stored in the database;
    a data interface communicating the building-related data to the database;
    a client interface communicating the building-related data between the client application and the data interface; and
    a service application accessing the database to process the building-related data, wherein the service application includes a metering service causing the building management system service to retrieve dynamic data from a meter on the building subsystem in accordance with a periodic metering frequency stored as configuration data in the database.

2. A building information system for communicating building-related data associated with a building with a client application, the system comprising:
    a database storing the building-related data including building management system (BMS) data and configuration data associated with the building;
    a building management system service managing a building subsystem and providing the BMS data stored in the database;
    a data interface communicating the building-related data to the database; and
    a client interface communicating the building-related data between the client application and the data interface;
    wherein the building-related data includes a first array of point identifiers received from the building management system service in a first point discovery operation, and the service application compares the first array to a second array of point identifiers received from the building management system service in a second point discovery operation, issuing an alarm if the first and second arrays fail to match.

3. A building information system for communicating building-related data associated with a building with a client application, the system comprising:
    a database storing the building-related data including building management system (BMS) data and configuration data associated with the building;
    a building management system service managing a building subsystem and providing the BMS data stored in the database;
    a data interface communicating the building-related data to the database;
    a client interface communicating the building-related data between the client application and the data interface; and
    a client application coupled through a communications network to the client interface to access the building-related data in the database, wherein the client application is a browser receiving data and instructions through the client interface for displaying a representation of the building-related data.

4. A building information system for communicating building-related data associated with a building with a client application, the system comprising:
    a database storing the building-related data including building management system (BMS) data and configuration data associated with the building;
    a building management system service managing a building subsystem and providing the BMS data stored in the database;
    a data interface communicating the building-related data to the database;
    a client interface communicating the building-related data between the client application and the data interface; and
    a client application coupled through a communications network to the client interface to access the building-related data in the database, wherein the configuration data is received from the client application through the client interface.

5. The method of claim 4 wherein the request is a point discovery request and the accessing operation comprises:
retrieving a first array of discovered points from the database;
causing a building management system service to discover points coupled to the building management system network;
receiving a second array of discovered points retrieved by the building management system service, responsive to the causing operation;
comparing the first and second arrays; and
issuing an alarm, if the first and second arrays fail to match.

6. The method of claim 5 further comprising:
retrieving a recipients list as configuration data from the database to identify recipients to which the alarm is issued.

7. The method of claim 4 further comprising:
scheduling a first periodic reading of a first device on a remote building management system network; and
scheduling a second periodic reading of a second device on the remote building management system network in a close grouping with the first reading to minimize a frequency of inter-network communications.

8. A method for communicating building-related data associated with a building on a building management system network, the method comprising:
receiving, by a server process, a request through a client interface from a client application;
accessing, in accordance with the request, a database storing the building-related data including building management system data and configuration data associated with the building;
issuing, by the server process, an acknowledgment of the accessing operation to the client application, the acknowledgment including at least one element of the building-related data;
scheduling a first periodic retrieval of dynamic data from a first device on the building management system network; and
scheduling a second periodic retrieval of dynamic data from a second device on the building management system network to minimize a frequency of readings on the building management system network.

9. A computer-readable medium having computer-executable instructions for performing the operations recited in claim 5.

* * * * *